(12) United States Patent
Yan et al.

(10) Patent No.: US 10,997,758 B1
(45) Date of Patent: May 4, 2021

(54) MEDIA OVERLAY PUBLICATION SYSTEM

(71) Applicant: Snap Inc., Santa Monica, CA (US)

(72) Inventors: Rong Yan, Marina Del Rey, CA (US); Peter Sellis, Venice, CA (US); Andrew G Cooper, Venice, CA (US); Yantao Zheng, Sunnyvale, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/673,137

(22) Filed: Aug. 9, 2017

Related U.S. Application Data

(63) Continuation of application No. 14/974,321, filed on Dec. 18, 2015, now Pat. No. 10,354,425.

(51) Int. Cl.
 *G06T 11/60* (2006.01)
 *G06F 3/0484* (2013.01)
 *H04L 29/08* (2006.01)

(52) U.S. Cl.
 CPC .......... *G06T 11/60* (2013.01); *G06F 3/04842* (2013.01); *G06F 3/04845* (2013.01); *H04L 67/18* (2013.01); *G06T 2200/24* (2013.01); *G06T 2200/32* (2013.01)

(58) Field of Classification Search
 CPC ....................................................... G06F 17/00
 See application file for complete search history.

(56) References Cited

U.S. PATENT DOCUMENTS

| | | | |
|---|---|---|---|
| 5,999,932 A | 12/1999 | Paul | |
| 6,038,295 A | 3/2000 | Mattes | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,353,170 B1 | 3/2002 | Eyzaguirre et al. | |

(Continued)

FOREIGN PATENT DOCUMENTS

| | | |
|---|---|---|
| CA | 2887596 A1 | 7/2015 |
| CN | 102572575 | 7/2012 |

(Continued)

OTHER PUBLICATIONS

"U.S. Appl. No. 14/304,855, Corrected Notice of Allowance dated Jun. 26, 2015", 8 pgs.

(Continued)

*Primary Examiner* — James J Debrow
(74) *Attorney, Agent, or Firm* — Schwegman Lundberg & Woessner, P.A.

(57) ABSTRACT

Systems and methods are presented that provide for receiving, at a media overlay publication system from a first client device, content to generate a media overlay, and generating the media overlay using the content received from the client device. The generated media overlay is stored in a database associated with the media overlay publication system and associated with a first characteristic of the content received from the first client device. The media overlay is provided to a second client device when a second characteristic of context data associated with the second client device correlates to the first characteristic for the media overlay, causing a display of the media overlay on a user interface of the second client device.

20 Claims, 33 Drawing Sheets

(56) References Cited

U.S. PATENT DOCUMENTS

| | | | |
|---|---|---|---|
| 6,484,196 B1 | 11/2002 | Maurille | |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 6,980,909 B2 | 12/2005 | Root et al. | |
| 7,027,124 B2 | 4/2006 | Foote et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,203,380 B2 | 4/2007 | Chiu et al. | |
| 7,356,564 B2 | 4/2008 | Hartselle et al. | |
| 7,411,493 B2 | 8/2008 | Smith | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,778,973 B2 | 8/2010 | Choi | |
| 8,001,204 B2 | 8/2011 | Burtner et al. | |
| 8,112,716 B2 | 2/2012 | Kobayashi | |
| 8,131,597 B2 | 3/2012 | Hudetz | |
| 8,199,747 B2 | 6/2012 | Rojas | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,332,475 B2 | 12/2012 | Rosen et al. | |
| 8,379,130 B2 | 2/2013 | Forutanpour et al. | |
| 8,405,773 B2 | 3/2013 | Hayashi et al. | |
| 8,418,067 B2 | 4/2013 | Cheng et al. | |
| 8,471,914 B2 | 6/2013 | Sakiyama et al. | |
| 8,560,612 B2 | 10/2013 | Kilmer et al. | |
| 8,681,178 B1 * | 3/2014 | Tseng | G09G 5/00 |
| 8,718,333 B2 | 5/2014 | Wolf et al. | |
| 8,724,622 B2 | 5/2014 | Rojas | |
| 8,744,523 B2 | 6/2014 | Fan et al. | |
| 8,745,132 B2 | 6/2014 | Obradovich | |
| 8,775,972 B2 | 7/2014 | Spiegel | |
| 8,788,680 B1 | 7/2014 | Naik | |
| 8,797,415 B2 | 8/2014 | Arnold | |
| 8,856,349 B2 | 10/2014 | Jain et al. | |
| 8,868,223 B1 | 10/2014 | Sharifi | |
| 8,874,677 B2 | 10/2014 | Rosen et al. | |
| 8,909,679 B2 | 12/2014 | Roote et al. | |
| 8,909,725 B1 | 12/2014 | Sehn | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,191,776 B2 | 11/2015 | Root et al. | |
| 9,204,252 B2 | 12/2015 | Root | |
| 9,258,459 B2 | 2/2016 | Hartley | |
| 9,269,011 B1 * | 2/2016 | Sikka et al. | G06K 9/3233 |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,430,783 B1 | 8/2016 | Sehn | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,645,221 B1 * | 5/2017 | Heizer | G06T 19/00 |
| 9,854,219 B2 | 12/2017 | Sehn | |
| 10,026,226 B1 * | 7/2018 | Lotto | G06T 19/00 |
| 10,311,916 B2 | 6/2019 | Sehn | |
| 10,354,425 B2 | 7/2019 | Yan et al. | |
| 10,580,458 B2 | 3/2020 | Sehn | |
| 10,811,053 B2 | 10/2020 | Sehn | |
| 2002/0047868 A1 | 4/2002 | Miyazawa | |
| 2002/0078456 A1 | 6/2002 | Hudson et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2003/0016247 A1 | 1/2003 | Lai et al. | |
| 2003/0017823 A1 | 1/2003 | Mager et al. | |
| 2003/0037124 A1 | 2/2003 | Yamaura et al. | |
| 2003/0052925 A1 | 3/2003 | Daimon et al. | |
| 2003/0164856 A1 | 9/2003 | Prager et al. | |
| 2004/0027371 A1 | 2/2004 | Jaeger | |
| 2004/0064429 A1 | 4/2004 | Hirstius et al. | |
| 2004/0111467 A1 | 6/2004 | Willis | |
| 2004/0203959 A1 | 10/2004 | Coombes | |
| 2004/0243531 A1 | 12/2004 | Dean | |
| 2004/0243688 A1 | 12/2004 | Wugofski | |
| 2005/0078804 A1 | 4/2005 | Yomoda | |
| 2005/0097176 A1 | 5/2005 | Schatz et al. | |
| 2005/0102381 A1 | 5/2005 | Jiang et al. | |
| 2005/0104976 A1 | 5/2005 | Currans | |
| 2005/0114783 A1 | 5/2005 | Szeto | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |
| 2006/0026067 A1 | 2/2006 | Nicholas et al. | |
| 2006/0114338 A1 | 6/2006 | Rothschild | |
| 2006/0242554 A1 | 10/2006 | Gerace et al. | |
| 2006/0265417 A1 | 11/2006 | Amato et al. | |
| 2006/0270419 A1 | 11/2006 | Crowley et al. | |
| 2007/0028183 A1 | 2/2007 | Ostojic et al. | |
| 2007/0038715 A1 | 2/2007 | Collins et al. | |
| 2007/0040931 A1 | 2/2007 | Nishizawa | |
| 2007/0073823 A1 | 3/2007 | Cohen et al. | |
| 2007/0082707 A1 | 4/2007 | Flynt et al. | |
| 2007/0192128 A1 | 8/2007 | Celestini | |
| 2007/0214216 A1 | 9/2007 | Carrer et al. | |
| 2007/0233801 A1 | 10/2007 | Eren et al. | |
| 2007/0243887 A1 | 10/2007 | Bandhole et al. | |
| 2007/0255456 A1 | 11/2007 | Funayama | |
| 2008/0025701 A1 | 1/2008 | Ikeda | |
| 2008/0033930 A1 | 2/2008 | Warren | |
| 2008/0049704 A1 | 2/2008 | Witteman et al. | |
| 2008/0062141 A1 | 3/2008 | Chandhri | |
| 2008/0094387 A1 | 4/2008 | Chen | |
| 2008/0104503 A1 | 5/2008 | Beall et al. | |
| 2008/0133336 A1 * | 6/2008 | Altman et al. | G06F 17/00 |
| 2008/0207176 A1 | 8/2008 | Brackbill et al. | |
| 2008/0208692 A1 | 8/2008 | Garaventi et al. | |
| 2008/0222545 A1 | 9/2008 | Lemay | |
| 2008/0256446 A1 | 10/2008 | Yamamoto | |
| 2008/0256577 A1 | 10/2008 | Funaki et al. | |
| 2008/0266421 A1 | 10/2008 | Takahata et al. | |
| 2008/0270938 A1 | 10/2008 | Carlson | |
| 2008/0313346 A1 | 12/2008 | Kujawa et al. | |
| 2009/0006565 A1 | 1/2009 | Velusamy et al. | |
| 2009/0015703 A1 | 1/2009 | Kim et al. | |
| 2009/0024956 A1 | 1/2009 | Kobayashi | |
| 2009/0040324 A1 | 2/2009 | Nonaka | |
| 2009/0042588 A1 | 2/2009 | Lottin et al. | |
| 2009/0058822 A1 | 3/2009 | Chaudhri | |
| 2009/0079846 A1 | 3/2009 | Chou | |
| 2009/0087161 A1 | 4/2009 | Roberts et al. | |
| 2009/0089678 A1 | 4/2009 | Sacco et al. | |
| 2009/0132453 A1 | 5/2009 | Hangartner et al. | |
| 2009/0132665 A1 | 5/2009 | Thomsen et al. | |
| 2009/0148045 A1 | 6/2009 | Lee et al. | |
| 2009/0153492 A1 | 6/2009 | Popp | |
| 2009/0157752 A1 | 6/2009 | Gonzalez | |
| 2009/0160970 A1 | 6/2009 | Fredlund et al. | |
| 2009/0177299 A1 | 7/2009 | Bartel Marinus | |
| 2009/0249222 A1 | 10/2009 | Schmidt et al. | |
| 2009/0265647 A1 | 10/2009 | Martin et al. | |
| 2009/0292608 A1 | 11/2009 | Polachek | |
| 2010/0082693 A1 | 4/2010 | Hugg et al. | |
| 2010/0131880 A1 | 5/2010 | Lee et al. | |
| 2010/0131895 A1 | 5/2010 | Wohlert | |
| 2010/0159944 A1 | 6/2010 | Pascal et al. | |
| 2010/0161635 A1 | 6/2010 | Dey | |
| 2010/0161831 A1 | 6/2010 | Haas et al. | |
| 2010/0183280 A1 | 7/2010 | Beauregard et al. | |
| 2010/0185665 A1 | 7/2010 | Horn et al. | |

(56) References Cited

U.S. PATENT DOCUMENTS

| | | |
|---|---|---|
| 2010/0191631 A1 | 7/2010 | Weidmann |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0273463 A1 | 10/2010 | Bonnefoy et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0202598 A1 | 8/2011 | Evans et al. |
| 2011/0211534 A1 | 9/2011 | Schmidt et al. |
| 2011/0255736 A1 | 10/2011 | Thompson et al. |
| 2011/0273575 A1 | 11/2011 | Lee |
| 2011/0283188 A1 | 11/2011 | Farrenkopf |
| 2011/0314084 A1 | 12/2011 | Saretto et al. |
| 2011/0320373 A1 | 12/2011 | Lee et al. |
| 2012/0004956 A1* | 1/2012 | Huston et al. ........... G06F 15/16 |
| 2012/0019722 A1* | 1/2012 | Kwisthout et al. ..... H04N 5/445 |
| 2012/0036443 A1 | 2/2012 | Ohmori et al. |
| 2012/0054797 A1 | 3/2012 | Skog et al. |
| 2012/0062805 A1 | 3/2012 | Candelore |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0136998 A1* | 5/2012 | Hough et al. ......... G06F 15/173 |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0184248 A1 | 7/2012 | Speede |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0307096 A1 | 12/2012 | Bray et al. |
| 2012/0323933 A1 | 12/2012 | He et al. |
| 2012/0324018 A1 | 12/2012 | Metcalf et al. |
| 2013/0024757 A1 | 1/2013 | Doll et al. |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0111514 A1 | 5/2013 | Slavin et al. |
| 2013/0128059 A1 | 5/2013 | Kristensson |
| 2013/0132477 A1 | 5/2013 | Bosworth et al. |
| 2013/0145286 A1 | 6/2013 | Feng et al. |
| 2013/0147837 A1* | 6/2013 | Stroila .................. G09G 5/377 |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0068692 A1* | 3/2014 | Archibong et al. ... H04N 21/23 |
| 2014/0082651 A1 | 3/2014 | Sharifi |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0279061 A1 | 9/2014 | Elimeliah et al. |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0289833 A1 | 9/2014 | Briceno |
| 2014/0317302 A1 | 10/2014 | Naik |
| 2014/0325383 A1 | 10/2014 | Brown et al. |
| 2014/0359656 A1* | 12/2014 | Banica et al. ....... H04N 21/812 |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0103097 A1* | 4/2015 | Li ........................... G06F 17/30 |
| 2015/0161812 A1* | 6/2015 | Basu ..................... G06T 19/00 |
| 2015/0178260 A1 | 6/2015 | Brunson |
| 2015/0185990 A1* | 7/2015 | Thompson ............ G06F 3/0484 |
| 2015/0206349 A1* | 7/2015 | Rosenthal et al. ...... G06T 19/00 |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0196584 A1* | 7/2016 | Franklin et al. ...... G06F 3/0482 |
| 2016/0239248 A1 | 8/2016 | Sehn |
| 2016/0277419 A1 | 9/2016 | Allen et al. |
| 2016/0321708 A1 | 11/2016 | Sehn |
| 2017/0134821 A1 | 5/2017 | D'amelio et al. |
| 2017/0263029 A1 | 9/2017 | Yan et al. |
| 2019/0237106 A1 | 8/2019 | Sehn |

(56) References Cited

U.S. PATENT DOCUMENTS

2020/0105304 A1    4/2020   Sehn
2020/0411058 A1    12/2020   Sehn

FOREIGN PATENT DOCUMENTS

| CN | 107710772 A | 2/2018 |
| JP | 2012104106 A | 5/2012 |
| KR | 20080028962 A | 4/2008 |
| KR | 20120125381 A | 11/2012 |
| KR | 102017508 B1 | 8/2019 |
| KR | 102077441 B1 | 2/2020 |
| KR | 102111446 B1 | 5/2020 |
| WO | WO-2011040821 A1 | 4/2011 |
| WO | WO-2014093668 A1 | 6/2014 |
| WO | WO-2015192026 A1 | 12/2015 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2017106529 A1 | 6/2017 |

OTHER PUBLICATIONS

"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015", 10 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Final Office Action dated Aug. 11, 2015", 23 pgs.
"U.S. Appl. No. 14/529,064, Non Final Office Action dated Mar. 12, 2015", 20 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed Oct. 12, 2015 to Final Office Action dated Aug. 11, 2015", 19 pgs.
"U.S. Appl. No. 14/529,064, Restriction Requirement dated Feb. 2, 2015", 5 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Corrected Notice of Allowance dated Oct. 30, 2017", 2 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowance dated Aug. 1, 2017", 5 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/612,692, Examiner Interview Summary dated Jan. 29, 2016", 5 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response filed Nov. 14, 2016 to Final Office Action dated Aug. 15, 2016", 15 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.

(56) References Cited

OTHER PUBLICATIONS

"U.S. Appl. No. 14/634,417, Final Office Action dated Jan. 31, 2017", 27 pgs.
"U.S. Appl. No. 14/634,417, Non Final Office Action dated Aug. 30, 2016", 23 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Nov. 30, 2016 to Non Final Office Action dated Aug. 30, 2016", 18 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/967,472, Final Office Action dated Mar. 10, 2017", 15 pgs.
"U.S. Appl. No. 14/967,472, Non Final Office Action dated Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Jun. 7, 2017 to Final Office Action dated Mar. 10, 2017", 12 pgs.
"U.S. Appl. No. 14/967,472, Response filed Dec. 5, 2016 to Non Final Office Action dated Sep. 8, 2016", 11 pgs.
"U.S. Appl. No. 14/974,321, Final Office Action dated Oct. 26, 2017", 16 pgs.
"U.S. Appl. No. 14/974,321, Non Final Office Action dated Jun. 29, 2017", 36 pgs.
"U.S. Appl. No. 14/974,321, Response filed Sep. 27, 2017 to Non Final Office Action dated Jun. 29, 2017", 13 pgs.
"U.S. Appl. No. 15/137,608, Preliminary Amendment filed Apr. 26, 2016", 6 pgs.
"U.S. Appl. No. 15/152,975, Non Final Office Action dated Jan. 12, 2017", 36 pgs.
"U.S. Appl. No. 15/152,975, Preliminary Amendment filed May 19, 2016", 8 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,372, Preliminary Amendment filed May 5, 2017", 10 pgs.
"U.S. Appl. No. 15/224,359, Preliminary Amendment filed Apr. 19, 2017", 8 pgs.
"U.S. Appl. No. 15/298,806, Preliminary Amendment filed Oct. 21, 2016", 8 pgs.
"U.S. Appl. No. 15/416,846, Preliminary Amendment filed Feb. 18, 2017", 10 pgs.
"Canadian Application Serial No. 2,894,332 Response filed Jan. 24, 2017 to Office Action dated Aug. 16, 2016", 15 pgs.
"Canadian Application Serial No. 2,894,332, Office Action dated Aug. 16, 2016", 4 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
"International Application Serial No. PCT/EP2008/063682, International Search Report dated Nov. 24, 2008", 3 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2016/066976, International Search Report dated May 17, 2017", 7 pgs.
"International Application Serial No. PCT/US2016/066976, Invitation to Pay Add'l Fees and Partial Search Rpt dated Mar. 6, 2017", 8 pgs.
"International Application Serial No. PCT/US2016/066976, Written Opinion dated May 17, 2017", 7 pgs.
"iVisit Mobile Getting Started", IVISIT, (Dec. 4, 2013), 1-16.
"Pluraleyes by Red Giant", © 2002-2015 Red Giant LLC, [Online], Retrieved from the Internet: <URL: http://www.redgiant.com/products/pluraleyes/, (Accessed Nov. 11, 2015), 5 pgs.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Leyden, John, "This SMS will self-destruct in 40 seconds", [Online]. Retrieved from the Internet: >URL: http://www.theregister.co.uk/2005/12/12/stealthtext/, (Dec. 12, 2005), 1 pg.
Melanson, Mike, "This text message will self destruct in 60 seconds", readwrite.com, [Online]. Retrieved from the Internet: <http://readwrite.com/2011/02/11/this_text_message_will_self_destruct_in_60_seconds>, (Feb. 18, 2015).
Sawers, Paul, "Snapchat for iOS Lets You Send Photos to Friends and Set How long They're Visible for", [Online]. Retrieved from the

(56) References Cited

OTHER PUBLICATIONS

Internet: <http://thenextweb.com/apps/2012/05/07/Snapchat-for-ios-lets-you-send-photos-to-friends-and-set-how-long-theyre-visiblefor/#!_xCjrp>,, (May 7, 2012), 1-5.
Sawers, Paul, "Snapchat for ios lets you send photos to friends and set how long they're visible for", http://thenextweb.com/apps/2012/05/07/ snapchat-for-ios-lets-you-send-photos-to-f_riends-and-set-how-long-theyre-visible-for, (May 2012), 1-3 pgs.
Shein, Esther, "Ephemeral Data", Communications of the ACM vol. 56 | No. 9, (Sep. 2013), 20-22.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
"U.S. Appl. No. 14/974,321, Non Final Office Action dated May 31, 2018", 14 pgs.
"U.S. Appl. No. 14/967,472, Final Office Action date Jun. 25, 2018", 14 pgs.
"International Application Serial No. PCT US2016 066976, International Preliminary Report on Patentability dated Jun. 28, 2018", 9 pgs.
"U.S. Appl. No. 14/974,321, Response filed Aug. 30, 2018 to Non Final Office Action dated May 31, 2018", 14 pgs.
U.S. Appl. No. 14/974,321, filed Dec. 18, 2015, Method and System for Providing Context Relevant Media Augmentation.
U.S. Appl. No. 14/578,271, filed Dec. 19, 2014, Gallery of Videos Set to an Audio Time Line.
U.S. Appl. No. 14/967,472, filed Dec. 14, 2015, Gallery of Videos Set to an Audio Time Line.
"U.S. Appl. No. 14/578,271, Notice of Allowability dated Nov. 29, 2017", 3 pgs.
"U.S. Appl. No. 14/967,472, Non Final Office Action dated Jan. 12, 2018", 17 pgs.
"U.S. Appl. No. 14/967,472, Response filed Mar. 16, 2018 Non Final Office Action dated Jan. 12, 2018", 13 pgs.
"U.S. Appl. No. 14/974,321, Examiner Interview Summary dated Dec. 5, 2017", 3 pgs.
"European Application Serial No. 15870874.3, Extended European Search Report dated Nov. 29, 2017", 7 pgs.
"U.S. Appl. No. 14/967,472, Corrected Notice of Allowability dated Mar. 18, 2019", 3 pgs.
"U.S. Appl. No. 14/974,321, Corrected Notice of Allowability dated Feb. 13, 2019", 6 pgs.
"European Application Serial No. 16829020.3, Response filed Jan. 29, 2019 to Communication Pursuant to Rules 161(1) and 162 EPC dated Jul. 25, 2018", w/ English Claims, 17 pgs.
"Korean Application Serial No. 10-2017-7035789, Response filed Jan. 10, 2019 to Notice of Preliminary Rejection dated Nov. 12, 2018", w/ English Claims, 23 pgs.
"U.S. Appl. No. 14/967,472, Notice of Allowance dated Jan. 24, 2019", 6 pgs.
"U.S. Appl. No. 14/967,472, Response filed Sep. 21, 2018 to Final Office Action dated Jun. 25, 2018", 11 pgs.
"U.S. Appl. No. 14/974,321, Notice of Allowance dated Jan. 3, 2019", 9 pgs.
"Korean Application Serial No. 10-2017-7035789, Notice of Preliminary Rejection dated Nov. 12, 2018", W English Translation, 12 pgs.
"U.S. Appl. No. 14/967,472, Corrected Notice of Allowability dated Apr. 24, 2019", 3 pgs.
"U.S. Appl. No. 14/974,321, Corrected Notice of Allowability dated Apr. 19, 2019", 6 pgs.
"U.S. Appl. No. 14/974,321, Corrected Notice of Allowability dated Jun. 12, 2019", 6 pgs.
"U.S. Appl. No. 16/376,598, Non Final Office Action dated Jul. 25, 2019", 7 pgs.
"U.S. Appl. No. 16/376,598, Response filed Oct. 7, 2019 to Non-Final Office Action dated Jul. 25, 2019", 2 pgs.
"U.S. Appl. No. 16/376,598, Notice of Allowance dated Oct. 18, 2019", 5 pgs.
"Chinese Application Serial No. 201680035076.5, Office Action dated Sep. 4, 2019", w/ English Translation, 16 pgs.
"U.S. Appl. No. 16/376,598, Notice of Allowability dated Jan. 23, 2020", 2 pgs.
"U.S. Appl. No. 16/703,526, Notice of Allowance dated Jun. 19, 2020", 10 pgs.
"Chinese Application Serial No. 201680035076.5, Office Action dated May 27, 2020", w/ English Translation, 28 pgs.
"Chinese Application Serial No. 201680035076.5, Response filed Jul. 9, 2020 to Office Action dated May 27, 2020", w/ English Claims, 18 pgs.
"U.S. Appl. No. 16/703,526, Supplemental Notice of Allowability dated Aug. 10, 2020", 2 pgs.
"U.S. Appl. No. 16/703,526, Corrected Notice of Allowability dated Sep. 2, 2020", 2 pgs.
"European Application Serial No. 16829020.3, Communication Pursuant to Article 94(3) EPC dated Sep. 9, 2020", 3 pgs.
"Korean Application Serial No. 10-2020-7024025, Notice of Preliminary Rejection dated Sep. 1, 2020", w/ English Translation, 4 pgs.
"Korean Application Serial No. 10-2020-7024025, Response filed Nov. 2, 2020 to Notice of Preliminary Rejection dated Sep. 1, 2020", w/ English Claims, 12 pgs.
"Chinese Application Serial No. 201680035076.5, Response filed Jan. 12, 2021 to Office Action dated Nov. 18, 2020", w/ English Claims, 18 pgs.
"European Application Serial No. 15870874.3, Communication Pursuant to Article 94(3) EPC dated Feb. 21, 2021", 5 pgs.

\* cited by examiner

US 10,997,758 B1

MEDIA OVERLAY PUBLICATION SYSTEM

PRIORITY CLAIM

This application is a continuation of and claims the benefit of priority of U.S. patent application Ser. No. 14/974,321, filed on Dec. 18, 2015, which is hereby incorporated by reference herein in its entirety

TECHNICAL FIELD

The subject matter disclosed herein generally relates to providing context relevant media augmentation. Specifically, the present disclosure addresses systems and methods for a platform for publishing context relevant media augmentations, for presentation on user interfaces.

BACKGROUND

The number of digital photographs and videos taken with mobile wireless devices is increasingly outnumbering photographs taken with dedicated digital and film-based cameras. Thus, there are growing needs to improve the experience associated with mobile wireless digital photography and videography.

BRIEF DESCRIPTION OF THE DRAWINGS

Various ones of the appended drawings merely illustrate example embodiments of the present disclosure and should not be considered as limiting in scope.

DETAILED DESCRIPTION

Figure 1:
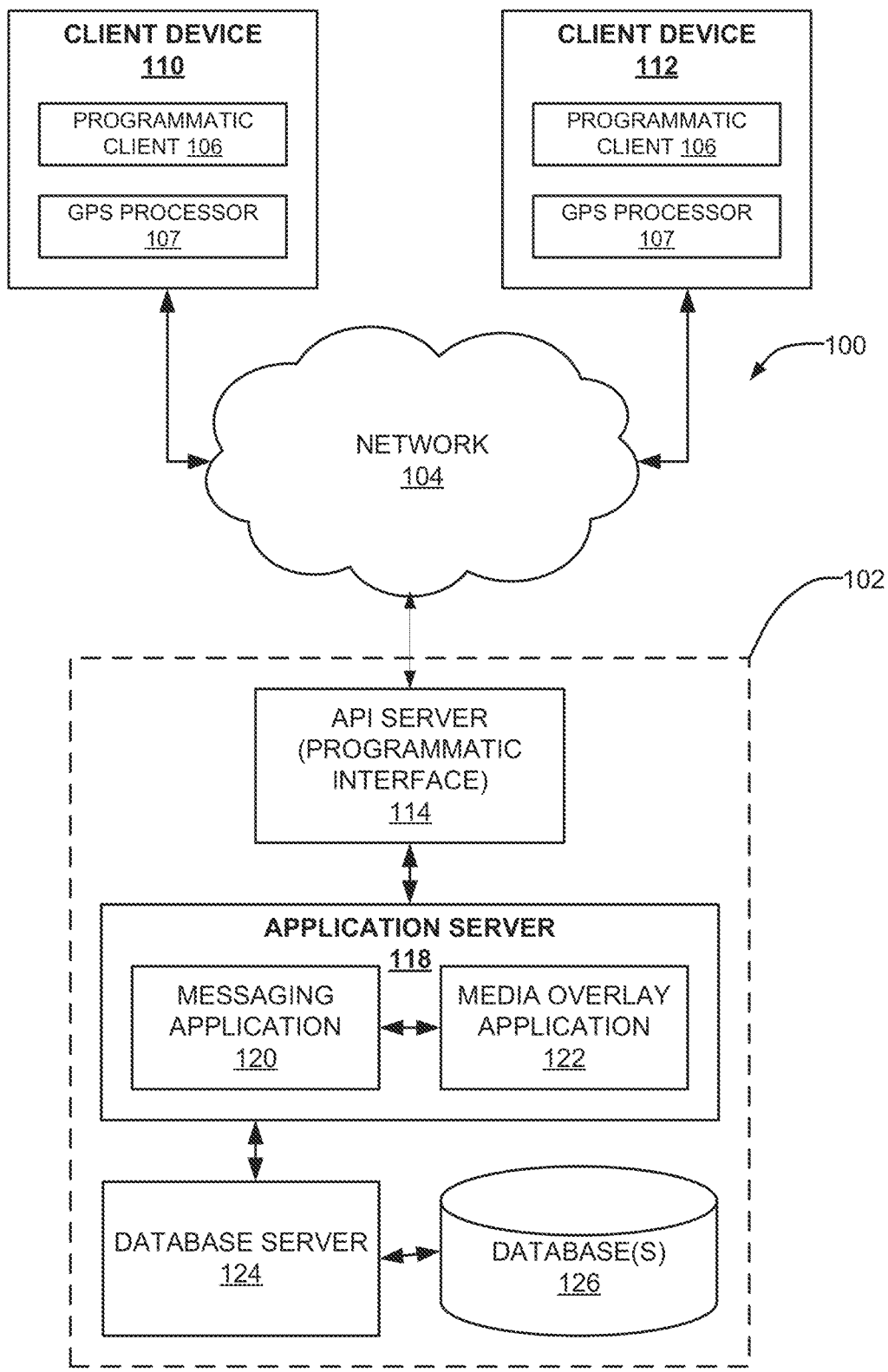
FIG. 1 is a network diagram depicting a network system having a client-server architecture configured for exchanging data over a network, according to one embodiment.

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The addition of labels, drawings, and other artwork (e.g., media overlays) to images (e.g., photographs or video) provides a compelling way for users to personalize, supplement, and enhance these images before storage or publication to a broader audience. An example embodiment seeks to provide users with a set of the media overlays (or other enhancements and augmentations) that may be applied to an image. The set of enhancements and augmentations, in the example form of media overlays, may be determined based on a location associated with the image and other contextual information, such as ambient noise or environmental acoustic (audio) sound, particular objects associated with the image, etc. The media overlays may be presented to a user for selection and combining with an image based on a determined location of the image, or content of the image. For example, where a user takes a photograph or video on a mobile device at a music concert, a media overlay indicating the name of the concert event and a band playing at a current time may be presented to the user for selection and overlay on the photograph or video. In another example, where a user initiates taking (or has taken) a photograph or video at Disneyland, an image overlay indicating the name "Disneyland", in a particular style, is presented to the user. Further Disneyland-themed image overlays may also be presented to the user. The presentation of the image overlay may be in response to the user performing a gesture (e.g., a swipe operation, a long press) on a screen of the mobile device. The user is then able to select the image overlay and have it applied to an image (e.g., an image that the user takes before the selection, or takes after the selection), in this way to personalize and enhance the image.

In an example embodiment, a media overlay may be presented to a user automatically upon detection of a particular event. For example, when a user initiates taking (or has taken) a photograph or video, content in the photograph or video (e.g., audio, an object, a location, etc.) can trigger one or more media overlays to be displayed to the user for selection. For example, a user may be taking a video that includes audio. A particular audio track may be identified from the audio and a media overlay may be created that includes information such as the audio track name, title, artist name, album art, etc. (as examples). This media overlay may be presented to the user to be incorporated with the video content or other content that the user has taken.

Third party entities (e.g., merchants, restaurants, individuals, etc.) may, in one example embodiment, seek to have overlays included in the set presented for user selection at a particular geographic location. For example, a restaurant at a particular location in San Francisco may wish to have its restaurant name and logo included in a set of media overlays presented to a user, for the purposes of augmenting a photograph taken by the user proximate to the restaurant. According to one example embodiment, such third party entities may bid (or otherwise purchase opportunities) to have a particular media overlay included in a set presented to a user for augmentation of a particular image. Below described are various systems and methodologies that may be used to technically implement the above described image enhancement technologies and capabilities.

More specifically, various examples of a media overlay publication application are described. The media overlay publication application operates at a server and generates media overlays that include content based on geographic locations (also referred to as geolocations) and other contextual information (e.g., characteristics of a content item). Other media enhancements or augmentations may include audio and visual content or visual effects that may be applied to augment a content or media item (e.g., photograph or video) at a mobile device. The media overlay publication application includes a user-based media overlay publication platform and a merchant-based media overlay publication platform.

In the user-based media overlay publication platform, the media overlay publication application may provide a Graphical User Interface (GUI) for a user to upload content and select a geolocation on a map. For example, the user may upload a logo and define boundaries on the map to identify a particular geolocation associated with the logo. Once the user submits the logo and identifies the particular geolocation, the media overlay publication application may generate a media overlay that includes the logo associated with the particular geolocation. As such, mobile devices that are located within the particular geolocation have access to the media overlay.

In the merchant-based media overlay publication platform, the media overlay publication application may provide a GUI for merchants to upload content, select geolocations on a map, and submit bids for the corresponding geolocations. A bidding process may determine the merchant with the highest bid amount. That merchant may then exclude publication of media overlays from other merchants at a selected geolocation of the merchant. Therefore, the media overlay of the highest-bidding merchant may be the only media overlay that can be accessed by mobile devices that are located at the selected geolocation.

In other examples, the media overlay includes context relevant data, such as a current temperature, an identification of a geolocation of the mobile device (e.g., Venice Beach), a name of a live event associated with the geolocation of the mobile device, or a name of a business.

In some embodiments, a media overlay application at a server provides a live event media overlay to a mobile device. The live event media overlay includes live event data associated with a live event, such as a concert event, a sporting event, or an award ceremony, at a geolocation of the mobile device. For example, a user attending a football game can access a sports media overlay that includes the current score of the football game. In another example, a user attending the Oscars award ceremony can access an entertainment media overlay that includes a name of an Oscar winner.

In other embodiments, the media overlay application at the server provides a social network media overlay to the mobile device. The social network media overlay may be based on social network activities of the user of the mobile device. For example, if the user follows a brand such as McDonald's on a social network service, and the mobile device of the user is located at a McDonald's restaurant, the mobile device of the user can access a McDonald's media overlay. Other users located at the same restaurant would not have access to the McDonald's media overlay unless they also follow McDonald's on the social network service. In another example, the order in which the media overlays are presented to users located at a McDonald's restaurant may be modified so that the McDonald's media overlay is served higher for users following McDonald's on the social network service.

In further embodiments, the media overlay application at the server provides a promotion media overlay to mobile device. The promotion media overlay may be based on promotions from a merchant. For example, the media overlay may be used to implement a Monopoly™ game at McDonald's by randomly selecting a media overlay every time the user of the mobile device walks into a McDonald's restaurant and purchases an item. The media overlay can be used to obtain Monopoly puzzle pieces that can be redeemed towards prizes.

In some embodiments, the media overlay application at the server enables the mobile device to collect media overlays. For example, the mobile overlay application provides the mobile device with permanent access to collected media overlays. The collected media overlays may be stored in a collection portfolio for the mobile device. The mobile device may access any of the media overlays in the collection portfolio at any time.

In some embodiments, the media overlay application at the server provides a history media overlay to the mobile device. The history media overlay may be based on geographic locations of historical sites visited by the user of the mobile device. For example, the mobile device is awarded with a unique media overlay associated with one of the Seven Wonders of the World when the mobile device is located at one of the corresponding Seven Wonders geographic locations.

In another embodiment, the media overlay application at the server provides a progressive use media overlay to the mobile device. The content in the progressive use media overlay changes depending on the number of people that have previously used the progressive use media overlay.

In another example embodiment, users can "purchase" a geolocation for a predetermined amount of time and select a media overlay associated with the geolocation. For example, a college can purchase and select a particular media overlay associated with the geolocation of its campus.

In another example embodiment, the media overlay application provides a viral media overlay to the mobile device. For example, when the user of the mobile device obtains the viral media overlay at a geolocation, that user can send the viral media overlay to mobile devices located outside the geolocation of the original user. Users of the mobile devices located outside the geolocation of the original user can make use of the viral media overlay for the next hour. Those users can also forward the viral media overlay to other users.

In another example embodiment, the media overlay application provides an actionable media overlay to the mobile device. For example, the actionable media overlay can be a link to open a browser page in the mobile device to obtain a coupon. The actionable media overlay can trigger other functions of the mobile device.

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and media communication, determining geolocation) and aspects (e.g., publication of media overlays, management of media overlays) associated with the network system 100 and its users. Although the network system 100 is illustrated herein as having a client-server architecture, other embodiments may include other network architectures, such as peer-to-peer or distributed network architectures.

A data exchange platform 102, in an example, includes a messaging application 120 and a media overlay application 122, and may provide server-side functionality via a network 104 (e.g., the Internet) to one or more clients. The one or more clients may include users that utilize the network system 100 and, more specifically, the messaging application 120 and the media overlay application 122, to exchange data over the network 104. These operations may include transmitting, receiving (communicating), and processing data to, from, and regarding content and users of the network system 100. The data may include, but is not limited to, content and user data such as user profiles, messaging content, messaging attributes, media attributes, client device information, geolocation information, media overlay content, messaging content persistence conditions, social network information, and live event data information, among others.

In various embodiments, the data exchanges within the network system 100 may be dependent upon user-selected functions available through one or more client or user interfaces (UIs). The UIs may be associated with a client machine, such as client devices 110, 112 using a programmatic client 106, such as a client application. The programmatic client 106 may be in communication with the messaging application 120 and media overlay application 122 via an application server 118. The client devices 110, 112 include mobile devices with wireless communication components, and audio and optical components for capturing various forms of media including photos and videos. The client devices 110 and 112 may further include a global positioning system (GPS) processor 107.

Turning specifically to the messaging application 120 and the media overlay application 122, an application program interface (API) server 114 is coupled to, and provides a programmatic interface to, one or more application server(s) 118. The application server 118 hosts the messaging application 120 and the media overlay application 122. The application server 118 is coupled to one or more database servers 124 that facilitate access to one or more databases 126.

The API server 114 communicates and receives data pertaining to messages and media overlays, among other things, via various user input tools. For example, the API server 114 may send and receive data to and from an application (e.g., the programmatic client 106) running on another client machine (e.g., client devices 110, 112 or a third party server).

In one example embodiment, the messaging application 120 provides messaging mechanisms for users of the client devices 110, 112 to send messages that include text and media content such as pictures and video. The client devices 110, 112 can access and view the messages from the messaging application 120 for a limited period of time. For example, the client device 110 can send a message to the client device 112 via the messaging application 120. Once the client device 112 accesses the message from the messaging application 120, the message is deleted after a predefined duration has elapsed from the time the client device 112 started viewing the message. Components of the messaging application 120 are described in more detail below with respect to FIG. 2.

In one example embodiment, the media overlay application 122 provides a system and a method for operating and publishing media overlays for messages processed by the messaging application 120. The media overlay application 122 supplies a media overlay to the client device 110 based on characteristics of a content item (e.g., photograph or video) or a geolocation of the client device 110. In another example, the media overlay application 122 supplies a media overlay to the client device 110 based on other information, such as social network information of the user of the client device 110.

The media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph generated at the client device 110. In another example, the media overlay includes an identification of a location overlay (e.g., Venice Beach), a name of a live event, a name of a merchant overlay (e.g., Beach Coffee House), or a name of a song. In another example, the media overlay application 122 uses the geolocation of the client device 110 to identify a media overlay that includes the name of a merchant at the geolocation of the client device 110. The media overlay may include other indicia associated with the merchant. Examples of indicia include logos and other pictures related to the merchant. The media overlays may be stored in the database(s) 126 and accessed through the database server 124.

In one example embodiment, the media overlay application 122 includes a user-based publication platform that enables users to select a geolocation on a map, and upload content associated with the selected geolocation. The user may also indicate other circumstances under which a particular media overlay can be provided. The media overlay application 122 generates a media overlay that includes the uploaded content and associates the uploaded content with the selected geolocation.

In another example embodiment, the media overlay application 122 includes a merchant-based publication platform that enables merchants to select a particular media overlay associated with a geolocation via a bidding process. For example, the media overlay application 122 associates the media overlay of a highest-bidding merchant with a corresponding geolocation for a predefined amount of time. Components of the media overlay application 122 are described in more detail below with respect to FIG. 3.

Figure 2:
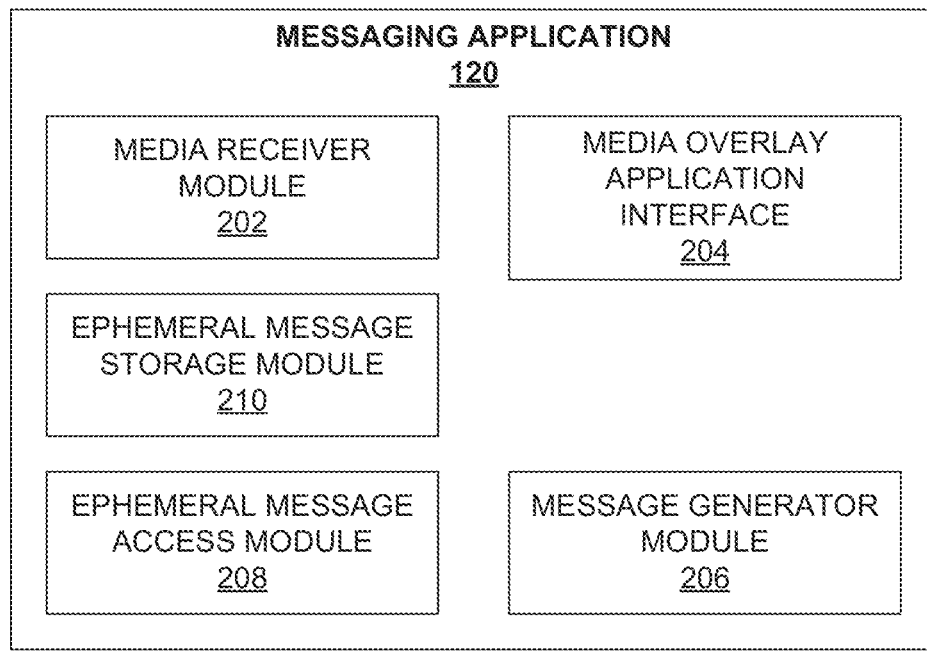
FIG. 2 shows a block diagram illustrating one example embodiment of a messaging application.

FIG. 2 shows a block diagram illustrating one example embodiment of the messaging application 120. The messaging application 120 may be hosted on dedicated or shared server machines (not shown) that are communicatively coupled to enable communications between the server machines. The messaging application 120 and the media overlay application 122 themselves are communicatively coupled (e.g., via appropriate interfaces) to each other and to various data sources, so as to allow information to be passed between the messaging application 120 and the media overlay application 122, or so as to allow the messaging application 120 and the media overlay application 122 to share and access common data. The messaging application 120 and the media overlay application 122 may, furthermore, access the one or more databases 126 via the database server(s) 124.

The messaging application 120 is responsible for the generation and delivery of messages between users of the programmatic client 106. The messaging application 120 may utilize any one of a number of message delivery networks and platforms to deliver messages to users. For example, the messaging application 120 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

In one example embodiment, the messaging application 120 includes a media receiver module 202, a media overlay application interface 204, a message generator module 206, an ephemeral message access module 208, and an ephemeral message storage module 210. The media receiver module 202 receives a message from the programmatic client 106 of the client device 110. The message may include a combination of text, photo, or video. The media receiver module 202 also receives persistence metadata associated with the message. The persistence metadata defines how long a message can be viewed. For example, the user of the client device 110 may specify that the message be persistent or can only be viewed or accessed for a user-determined amount of time (e.g., ten seconds). The media overlay application interface 204 communicates with the media overlay application 122 to access and retrieve a media overlay associated with the metadata in the message. The message generator module 206 applies the media overlay to the message from the programmatic client 106 to create an ephemeral message, and temporarily stores the ephemeral message using the ephemeral message storage module 210.

The ephemeral message access module 208 notifies a recipient of the message of the availability of the ephemeral message. The ephemeral message access module 208 receives a request to access the ephemeral message from the recipient and causes the ephemeral message to be displayed on a client device of the recipient for the maximum duration specified in the persistence metadata. Once the recipient views the message for the maximum duration, the ephemeral message access module 208 causes the client device of the recipient to stop displaying the ephemeral message, and deletes the ephemeral message from the ephemeral message storage module 210.

Figure 3:
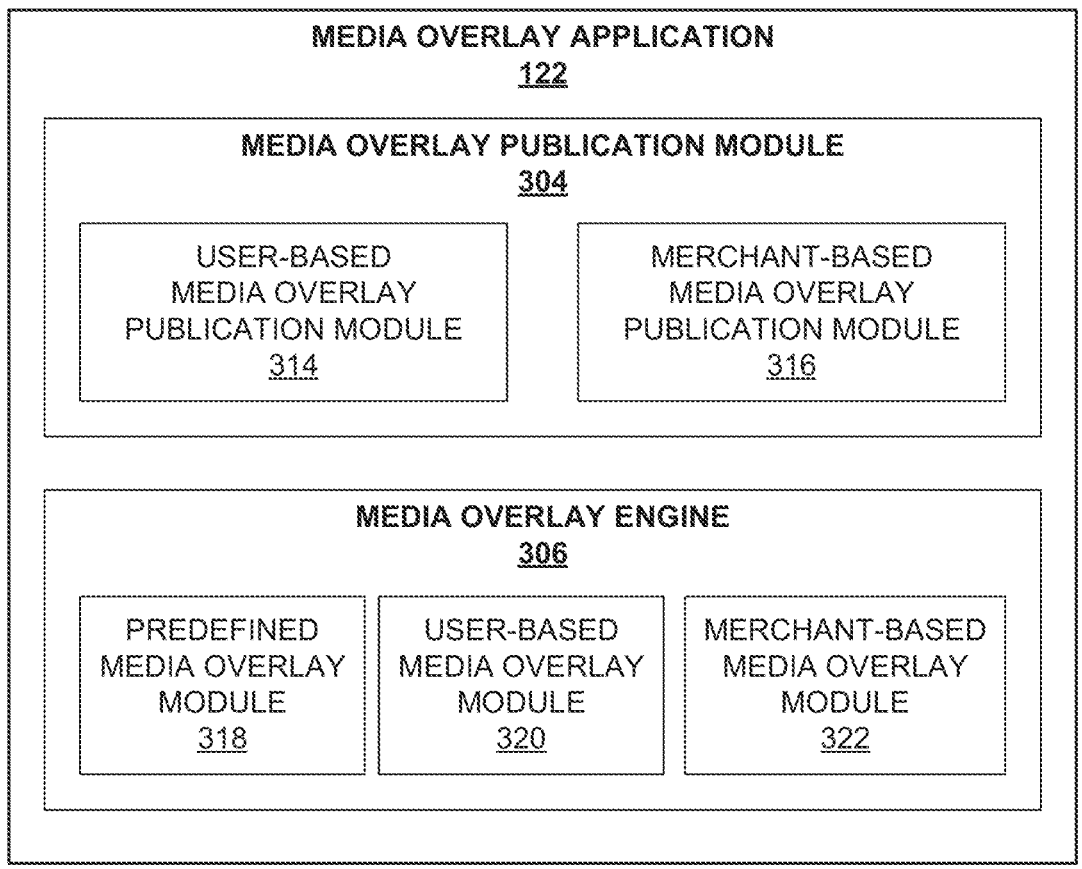
FIG. 3 shows a block diagram illustrating one example embodiment of a media overlay application.

FIG. 3 shows a block diagram illustrating one example embodiment of the media overlay application 122. The media overlay application 122 includes a media overlay publication module 304 and a media overlay engine 306.

The media overlay publication module 304 provides a platform for publication of media overlays. In an example embodiment, the media overlay publication module 304 includes a user-based media overlay publication module 314 and a merchant-based media overlay publication module 316. The user-based media overlay publication module 314 enables users of client devices (either mobile or web clients) to upload content and select a geolocation for a user-based media overlay. The merchant-based media overlay publication module 316 enables merchants to upload content, select a geolocation, and submit a bid amount for a merchant-based media overlay. The user-based media overlay publication module 314 is described in more detail below with respect to FIG. 4A. The merchant-based media overlay publication module 316 is described in more detail below with respect to FIG. 5A.

The media overlay engine 306 generates and supplies a media overlay based on a characteristic of a content item or a geolocation of a client device. In one example embodiment, the media overlay engine 306 includes a predefined media overlay module 318, a user-based media overlay module 320, and a merchant-based media overlay module 322. The media overlay may be based on predefined media overlays from the predefined media overlay module 318, user-based media overlays from the user-based media overlay module 320, and merchant-based media overlays from the merchant-based media overlay module 322.

The predefined media overlay module 318 supplies the client device with one of a set of predefined media overlays. Examples of predefined media overlays are described in more detail below with respect to FIG. 6A.

The user-based media overlay module 320 supplies the client device with a user-based media overlay generated by the user-based media overlay publication module 314. The merchant-based media overlay module 322 supplies the client device with a merchant-based media overlay generated by the merchant-based media overlay publication module 316.

Figure 4A:
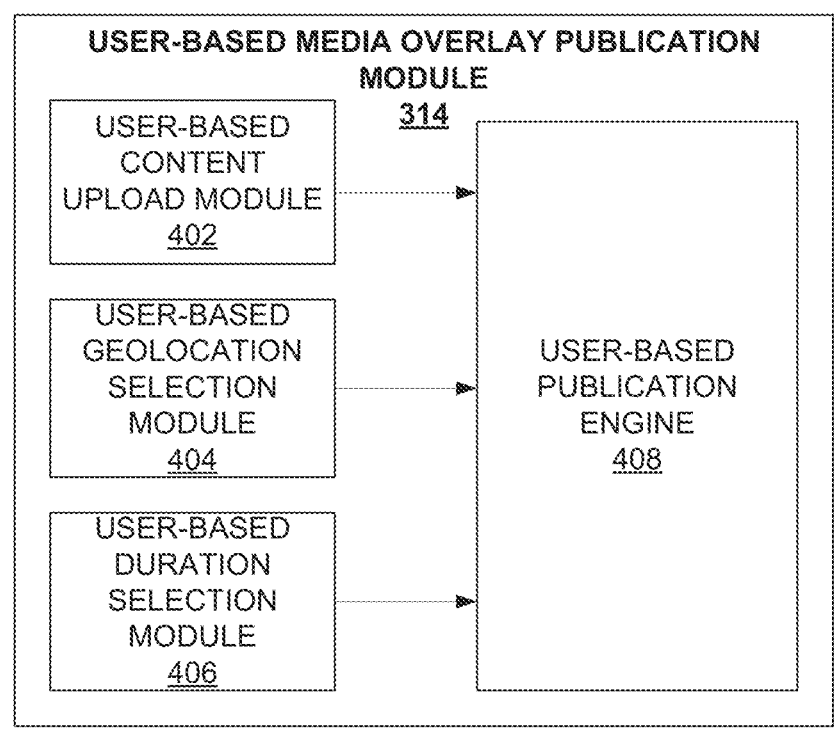
FIG. 4A shows a block diagram illustrating one example embodiment of a user-based media overlay publication module.

FIG. 4A shows a block diagram illustrating one example embodiment of the user-based media overlay publication module 314. The user-based media overlay publication module 314 includes a user-based content upload module 402, a user-based geolocation selection module 404, a user-based duration selection module 406, and a user-based publication engine 408.

Figure 4B:
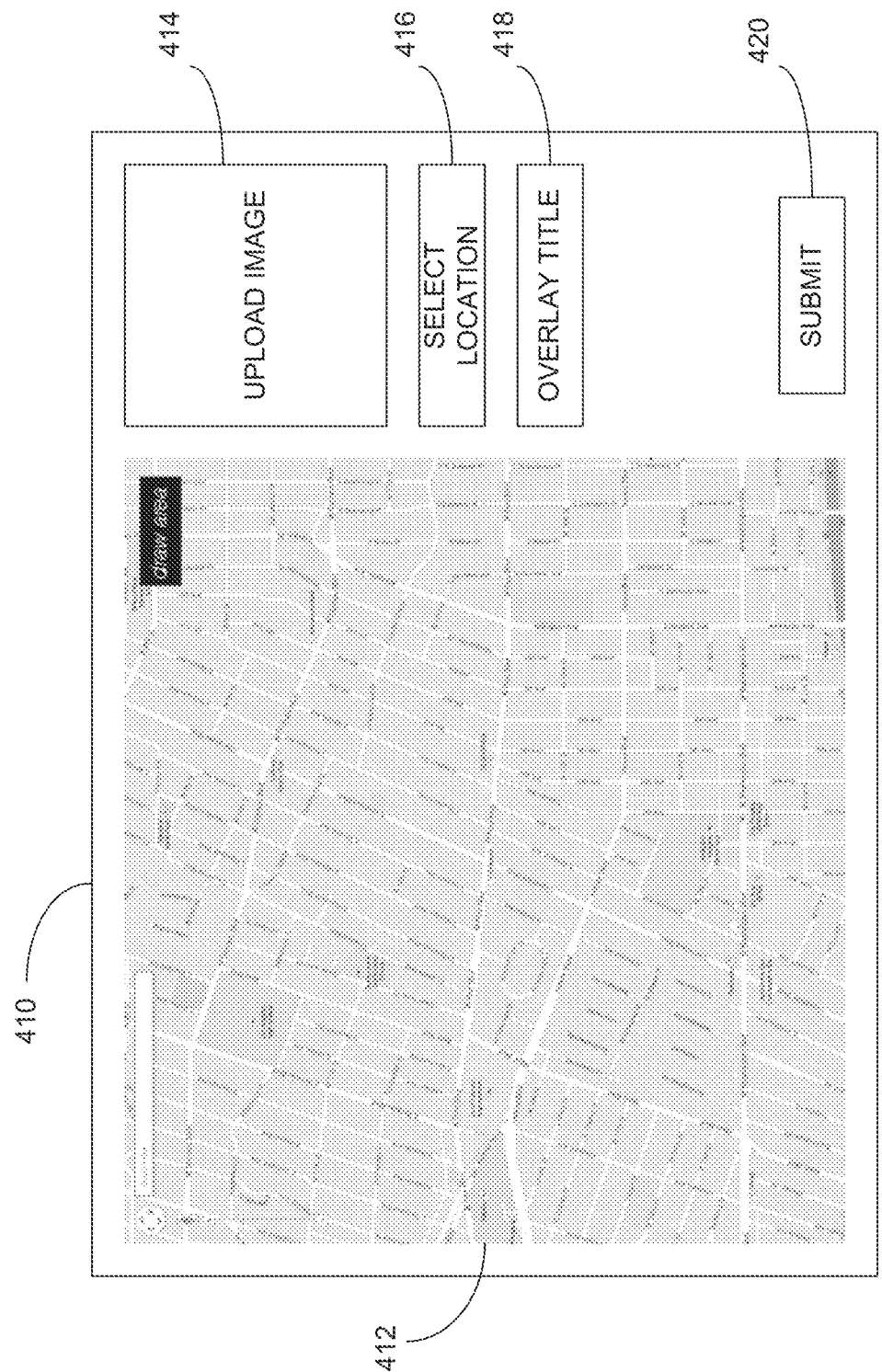
FIG. 4B shows an example of a graphical user interface for a user-based media overlay publication module.

The user-based content upload module 402 receives uploaded content from a user. The content may include a media item such as a photo or a video. The user-based content upload module 402 may be implemented on a web server to allow a user to upload the content using a GUI as illustrated in FIG. 4B.

The user-based geolocation selection module 404 receives geolocation identification information from the user to identify a selected geolocation. The geolocation identification information may include an address, an identification of an establishment already associated with the address, Global Positioning System (GPS) coordinates, or a geographic boundary. For example, the address may include a street number, street address, city, state, and country. The user may also identify a location based on an existing establishment. For example, the geolocation information may include "restaurant x" in Venice Beach. The geographic boundary identifies a region or a zone. For example, the geographic boundary may define a region located within a predetermined radius of an address, a point of interest, or an existing establishment.

Figure 4C:
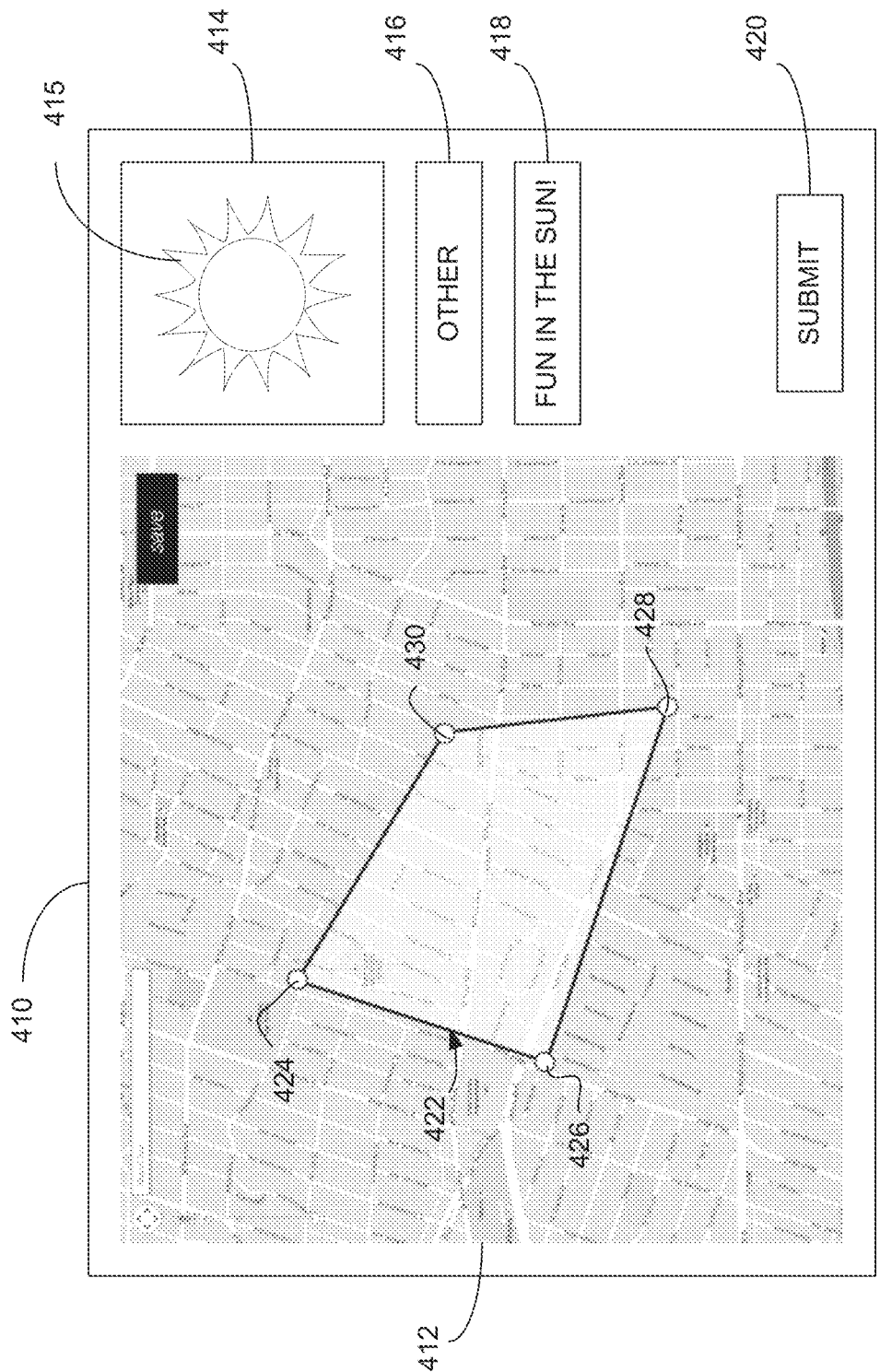
FIG. 4C shows an example of an operation of the graphical user interface of FIG. 4B.

In one example embodiment, the geolocation identification information may be embedded in a message or communication from a client device to the user-based geolocation selection module 404. For example, the user of the client device may take a picture of a sunset at Venice Beach and send the picture to the user-based geolocation selection module 404, which may then extract the geolocation attribute or identification information from metadata associated with the picture of the sunset. The user-based geolocation selection module 404 may be implemented on a web server to present a user with a GUI in a web page that allows the user to select the geolocation for the content as illustrated in FIG. 4C.

The user-based duration selection module 406 receives, from the user, time duration information related to the uploaded content and selected geolocation. The time duration information may identify a period of time during which the uploaded content is associated with the selected geolocation. Once the period of time has elapsed, the uploaded content is no longer associated with the selected geolocation. For example, if the time duration indicates twenty-four hours, the media overlay engine 306 makes the user-based media overlay available to client devices that are located at the selected geolocation. Once twenty-four hours has elapsed, the user-based media overlay is no longer accessible by the client devices at the selected geolocation.

Other embodiments include periodic time duration information or specific time duration information. For example, for the periodic time duration information, the user-based media overlay is published and made available at the selected geolocation every Sunday (e.g., a religion-related media overlay available on days of religious services). For the specific time duration information, the user-based media overlay is published and made available at the selected geolocation around a specific holiday or date (e.g., Thanksgiving weekend, New Year's day).

The user-based publication engine 408 generates a user-based media overlay that associates the uploaded content from the user-based content upload module 402 with the selected geolocation from the user-based geolocation selection module 404. The user-based publication engine 408 publishes the user-based media overlay to client devices that are located within the selected geolocation for the time duration identified with the user-based duration selection module 406.

In another example embodiment, the user-based publication engine 408 determines that no other user-based media overlays exist during the same period of time for the same selected geolocation. The user-based publication engine 408 may publish just one user-based media overlay at any time for the same selected geolocation. In another example embodiment, a limit may be placed on the number of user-based media overlays available at any time for the same selected geolocation. Thus, the user-based publication engine 408 may publish and make available a limited number of user-based media overlays at any time for the same selected geolocation. In another example embodiment, user-based media overlays may be published to only contacts or "friends" of the uploading user.

FIG. 4B illustrates an example of a GUI 410 for uploading content and for selecting a geographic region on a map. The GUI 410 includes a map 412, an upload image box 414, a select location button 416, a overlay title box 418, and a submit button 420. The upload image box 414 enables a user to upload content (e.g., a picture) to the user-based content upload module 402. The select location button 416 enables the user to identify a geolocation by drawing boundaries on the map 412 or by inputting an address or a zip code. The identified geolocation is submitted to the user-based geolocation selection module 404. The overlay title box 418 enables the user to submit a name for the media overlay. The user may submit the content and the requested geolocation by clicking on the submit button 420. Once the content and requested geolocation are submitted, the user-based publication engine 408 generates a user-based media overlay that includes the uploaded content for the identified geolocation.

FIG. 4C illustrates an example where user-identified boundary points 424, 426, 428, and 430 on the map 412 define a geolocation 422. The user has uploaded a picture of the sun 415 displayed in the upload image box 414. The user has entered the title of the content "Fun in the sun!" in the overlay title box 418. The user may submit the picture of the sun 415 and the geolocation 422 by clicking on the submit button 420. Once the picture of the sun 415 and the geolocation 422 are submitted, the user-based publication engine 408 generates a user-based media overlay.

Figure 4D:
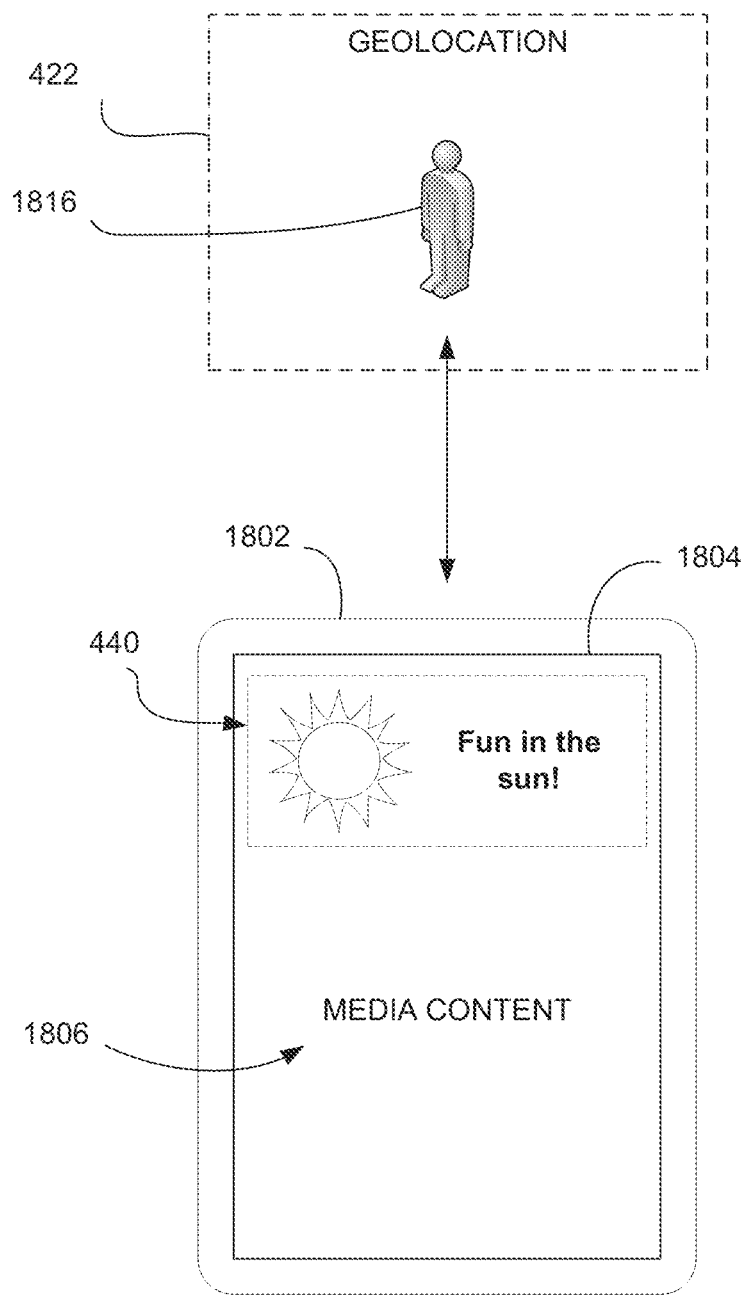
FIG. 4D illustrates an example of a publication of a user-based media overlay.

FIG. 4D illustrates an example of a publication of a user-based media overlay. The media overlay application 122 detects that a mobile device 1802 of a user 1816 is located at the geolocation 422. The media overlay application 122 retrieves a user-based media overlay 440 corresponding to the geolocation 422 and publishes the user-based media overlay 440 to the mobile device 1802. The user-based media overlay 440 is applied to media content 1806 in a display 1804 of the mobile device 1802.

Figure 5A:
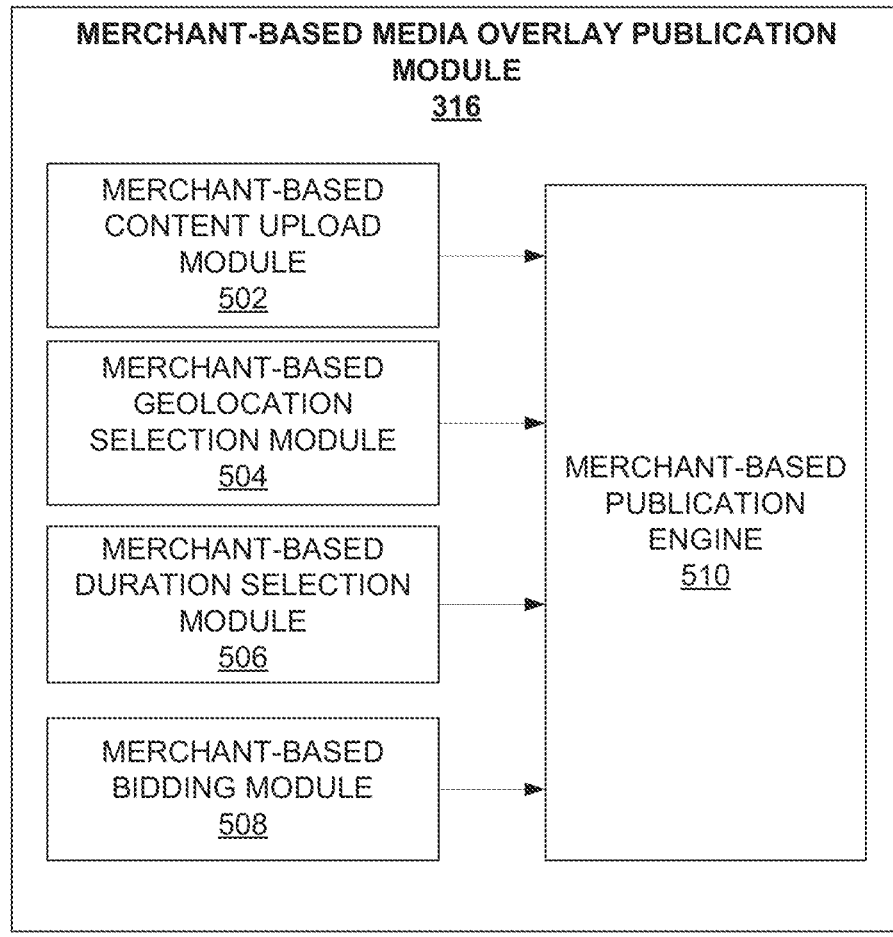
FIG. 5A shows a block diagram illustrating one example embodiment of a merchant-based media overlay publication module.

FIG. 5A shows a block diagram illustrating one example embodiment of the merchant-based media overlay publication module 316. The merchant-based media overlay publication module 316 includes a merchant-based content upload module 502, a merchant-based geolocation selection module 504, a merchant-based duration selection module 506, a merchant-based bidding module 508, and a merchant-based publication engine 510.

The merchant-based content upload module 502 receives content from a merchant. The content may include a media item such as a picture, a video, a graphic, or a text. The merchant-based content upload module 502 may be implemented on a web server to allow a merchant to upload the content using a webpage.

The merchant-based geolocation selection module 504 receives geolocation identification information from the merchant to identify a selected geolocation. The geolocation identification information may include an address of an establishment, an identification of an establishment already associated with the address, GPS coordinates, or a geographic boundary. For example, the address of the establishment may include a street number, street address, city, state, and country. The merchant may also identify a location based on an existing establishment. For example, the geolocation information may include "restaurant x" in Venice Beach. The geographic boundary identifies a region or a zone. For example, the geographic boundary may define a region located within a predetermined radius of an address, a point of interest, or an existing establishment. The merchant may further define the geographic boundary by drawing a virtual fence on a map. The merchant-based geolocation selection module 504 may be implemented on a web server to allow a merchant to draw boundaries on a map in a web page.

The merchant-based duration selection module 506 receives, from the merchant, time duration information related to the uploaded content and selected geolocation. The time duration may identify a period of time in which the uploaded content is associated with the selected geolocation. Once the period of time has elapsed, the uploaded content is no longer associated with the selected geolocation. Other embodiments include periodic time duration information or specific time duration information. For example, for the periodic time duration information, the merchant-based media overlay is published or made available at the selected geolocation (e.g., corner of two identified streets) every Saturday night (e.g., a nightclub-related media overlay available every Saturday night). For the specific time duration information, the selected media overlay is published or made available at the selected geolocation around a specific date (e.g., party event date).

Figure 5B:
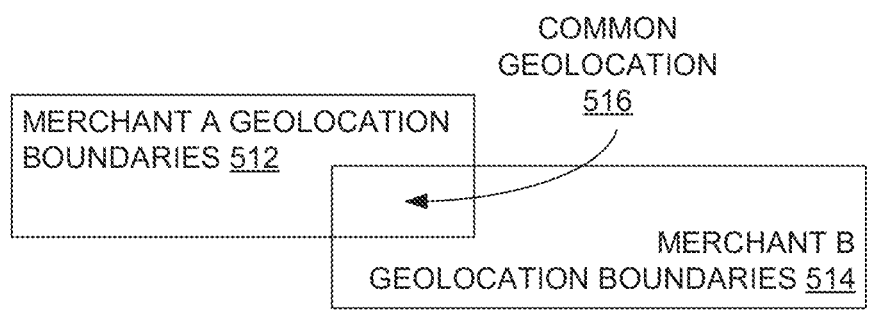
FIG. 5B illustrates an example of a common geolocation.

The merchant-based bidding module 508 provides an interface to enable merchants to submit a bid amount for a common geolocation. The common geolocation may include, for example, a same street address. For example, several businesses may have the same street address but different suite numbers in a shopping center. FIG. 5B illustrates an example of a common geolocation 516. Merchant A geolocation boundaries 512 overlap with merchant B geolocation boundaries 514 to define a common geolocation 516. Thus, merchants A and B may submit respective bids corresponding to the common geolocation 516. In one example embodiment, the merchant-based geolocation selection module 504 determines common geolocations from the geolocations selected by the merchants. The merchant-based bidding module 508 identifies a highest bidder for the common geolocation 516 and awards the highest bidder with the ability to exclude other merchant-based media overlays from the common geolocation 516 for a predefined amount of time.

In another example embodiment, the merchant-based bidding module 508 prorates bid amounts based on their corresponding time duration information. For example, merchant A submits a bid amount of $100 for one day for a specific geolocation. Merchant B submits a bid amount of $160 for two days for the same specific geolocation. The merchant-based bidding module 508 may prorate the bid from merchant B for one day (e.g., $80) and compare both bids for the same period of time (e.g., one day) to determine a highest bidder.

The merchant-based publication engine 510 generates a merchant-based media overlay that associates the uploaded content of the highest bidder with the geolocation identified by the highest bidder. The merchant-based publication engine 510 publishes the merchant-based media overlay to client devices that are located at the geolocation selected by the highest bidder for the time duration identified with the merchant-based duration selection module 506. Merchant-based media overlays from other merchants in the common geolocation 516 are excluded from publication. In another embodiment, a quota may be placed on the number of merchant-based media overlays available for the common geolocation 516. For example, the merchant-based publication engine 510 may publish and make available a limited number of merchant-based media overlays (e.g., a maximum of two merchant-based media overlays) for the common geolocation 516.

In another example embodiment, the merchant-based publication engine 510 forms a priority relationship that associates the uploaded content of the highest bidder with the geolocation selected by the highest bidder. For example, an order in which media overlays are displayed at the client device 110 may be manipulated based on the results from the merchant-based bidding module 508. A media overlay of a merchant with the highest bid may be prioritized and displayed first at the client device 110. Media overlays from other merchants may be displayed at the client device 110 after the media overlay of the highest bidder. In another example embodiment, a merchant may be able to bid on all locations at which it maintains a presence. Thus, a restaurant chain may be able to have its media overlay(s) published at each of its restaurant chain locations.

Figure 5C:
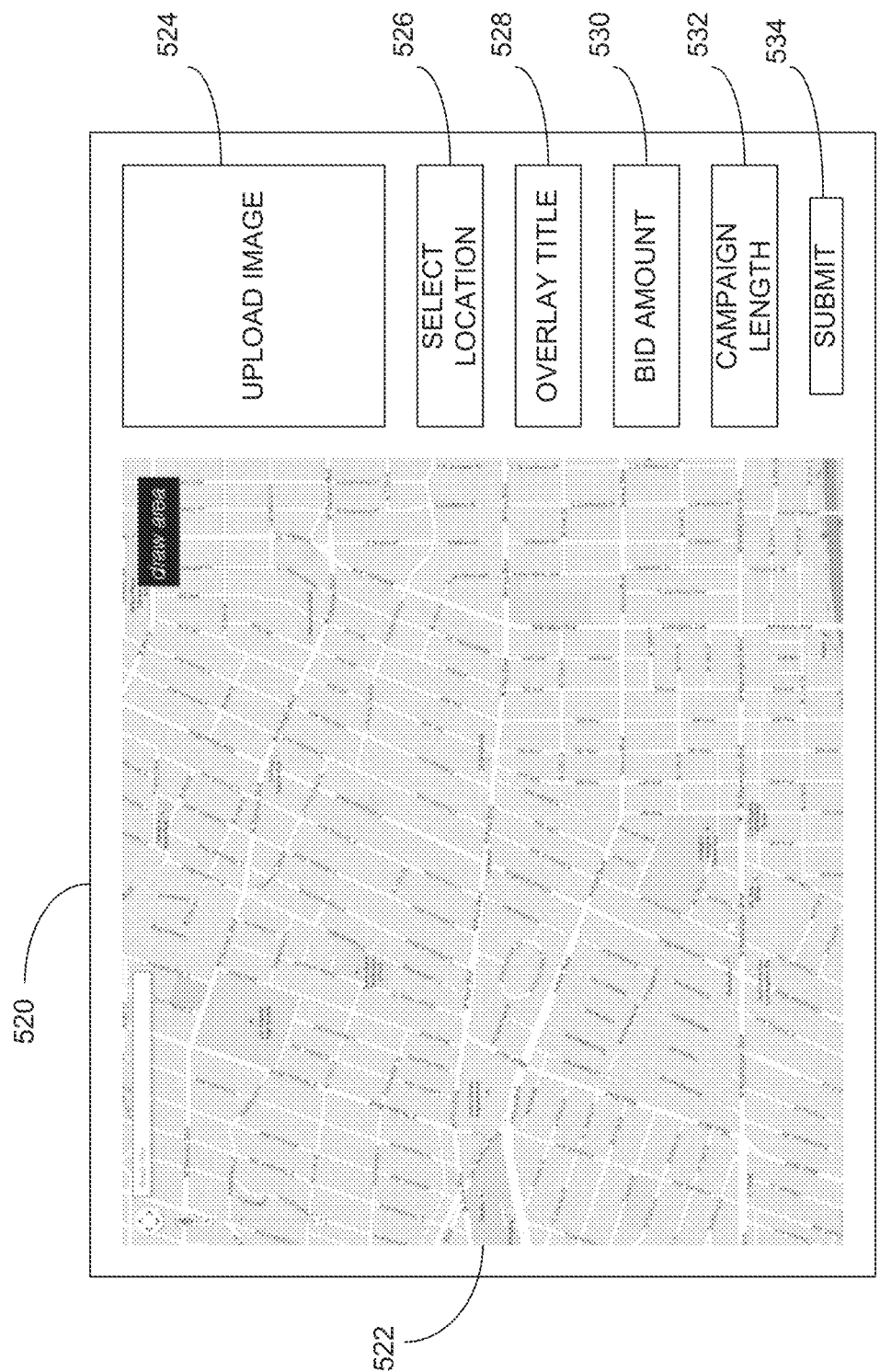
FIG. 5C illustrates an example of a graphical user interface for a merchant-based media overlay publication module.

FIG. 5C illustrates an example of a GUI 520 for uploading content and for selecting a geolocation on a map. The GUI 520 includes a map 522, an upload image box 524, a select location button 526, an overlay title box 528, a bid amount entry box 530, a campaign length entry box 532, and a submit button 534. The upload image box 524 enables a merchant to upload content (e.g., a picture, a video, or an animation) to the merchant-based content upload module 502. The select location button 526 enables the merchant to identify a geolocation by drawing boundaries on the map 522 or by inputting an address or a zip code. The overlay title box 528 enables the merchant to submit a name for the media overlay. The bid amount entry box 530 enables the merchant to enter a bid amount for the identified geolocation. The campaign length entry box 532 enables the merchant to specify a length of a campaign in which the uploaded content is associated with the identified geolocation. The merchant may submit the uploaded content and entered information by clicking on the submit button 534.

Figure 5D:
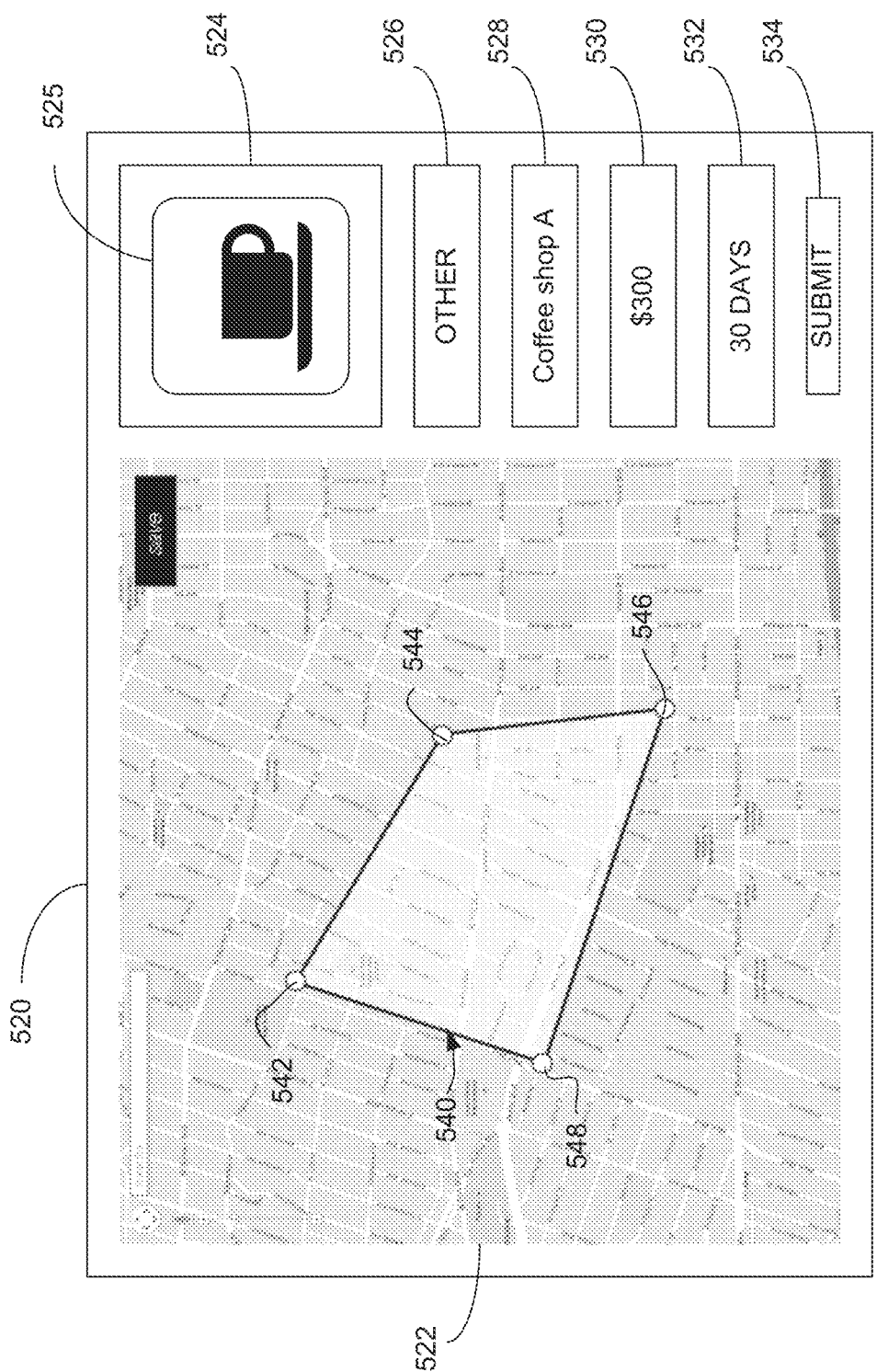
FIG. 5D illustrates an example of a bid from a first merchant using the graphical user interface of FIG. 5C.

FIG. 5D illustrates an example where a merchant A has identified boundary points 542, 544, 546, and 548 on the map 522 to define a geolocation 540. Merchant A has uploaded a picture 525 displayed in the upload image box 524. Merchant A has entered a title "Coffee shop A" in the overlay title box 528, a bid amount of $300 in the bid amount entry box 530, and a campaign length of 30 days in the campaign length entry box 532. Merchant A submits the picture 525, the requested geolocation 540, and other entered information by clicking on the submit button 534. The merchant-based publication engine 510 generates a media overlay for merchant A.

Figure 5E:
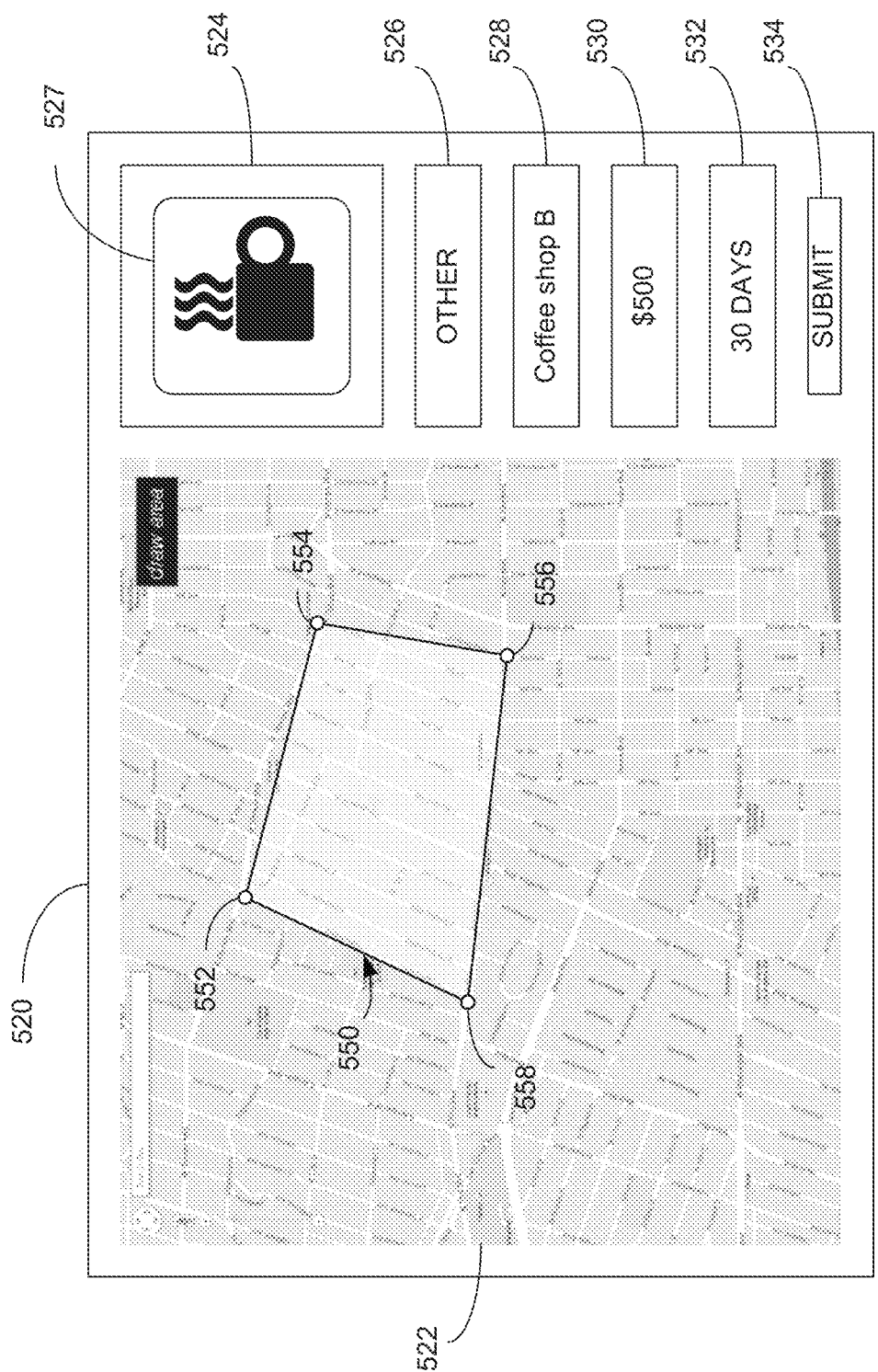
FIG. 5E illustrates an example of a bid from a second merchant using the graphical user interface of FIG. 5C.

FIG. 5E illustrates an example where another merchant, merchant B, has identified boundary points 552, 554, 556, and 558 on the map 522 to define a geolocation 550. Merchant B has uploaded a picture 527 displayed in the content upload box 524. Merchant B has entered a title "Coffee shop B" in the overlay title box 528, a bid amount of $500 in the bid amount entry box 530, and a campaign length of 30 days in the campaign length entry box 532. Merchant B may submit the picture 527, the requested geolocation 550, the bid amount, and the campaign length by clicking on the submit button 534. The merchant-based publication engine 510 generates a media overlay for merchant B.

Figure 5F:
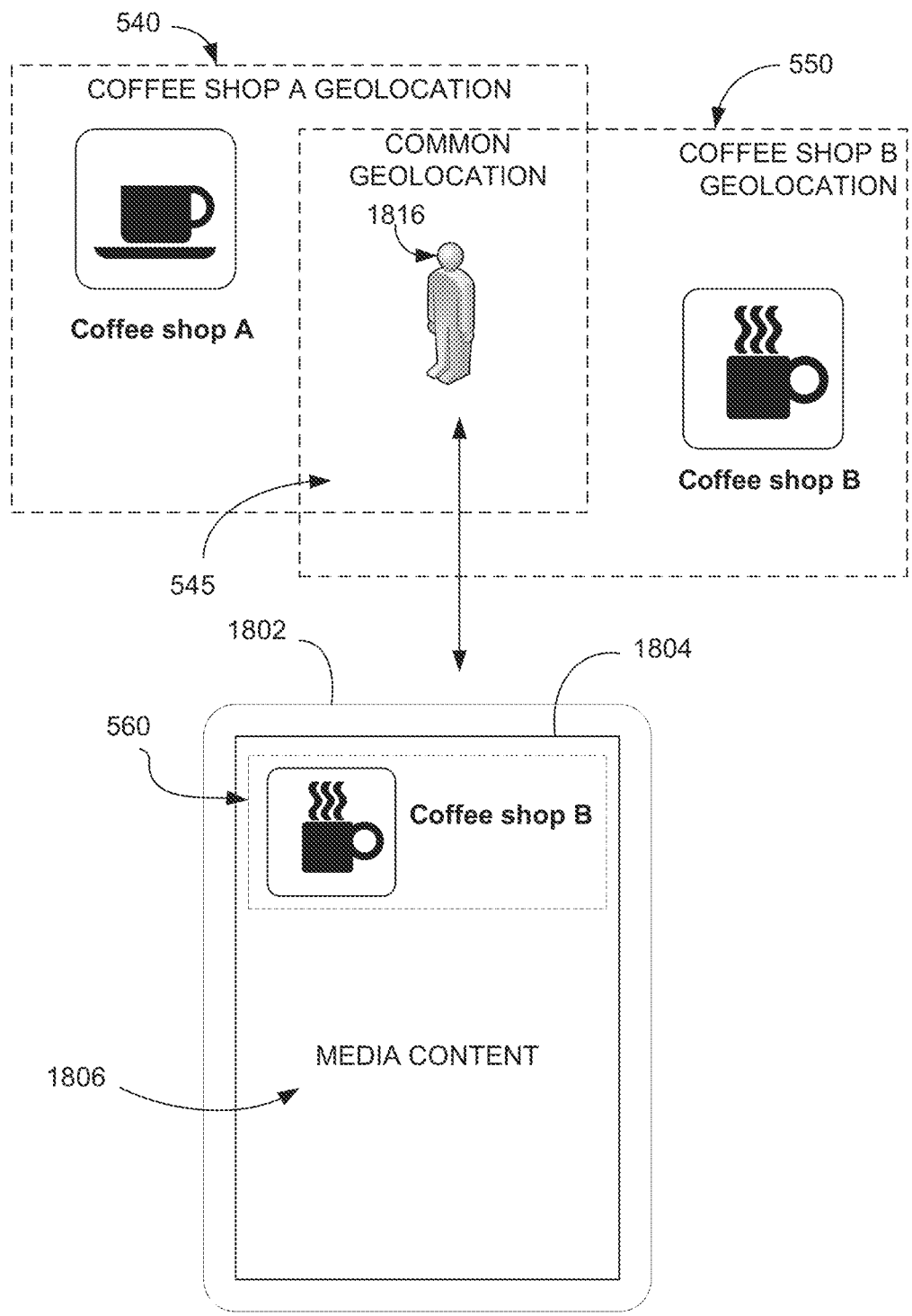
FIG. 5F illustrates an example of an operation of a merchant-based media overlay.

FIG. 5F shows a diagram illustrating an example of a merchant-based media overlay selected based on a bidding process. The geolocation 540 of merchant A and the geolocation 550 of merchant B overlap at a common geolocation 545. The user 1816 is located at the common geolocation 545 and uses the mobile device 1802 to generate the media content 1806 (e.g., user 1816 takes a picture) in the display 1804 of the mobile device 1802. The media overlay of the merchant with the highest bid for the common location 545 is published to the mobile device 1802. In the present example, merchant B has outbid merchant A. As such, a media overlay 560 of merchant B is provided and displayed in the display 1804 on top of the media content 1806. The media overlay 560 contains the uploaded content from merchant B. In addition, "merchant" in the context of the current example embodiments may include not only entities involved in the trade or sale of merchandise but any other entity as well, including individuals, universities, non-profit organizations, student organizations, clubs, etc.

Figure 6A:
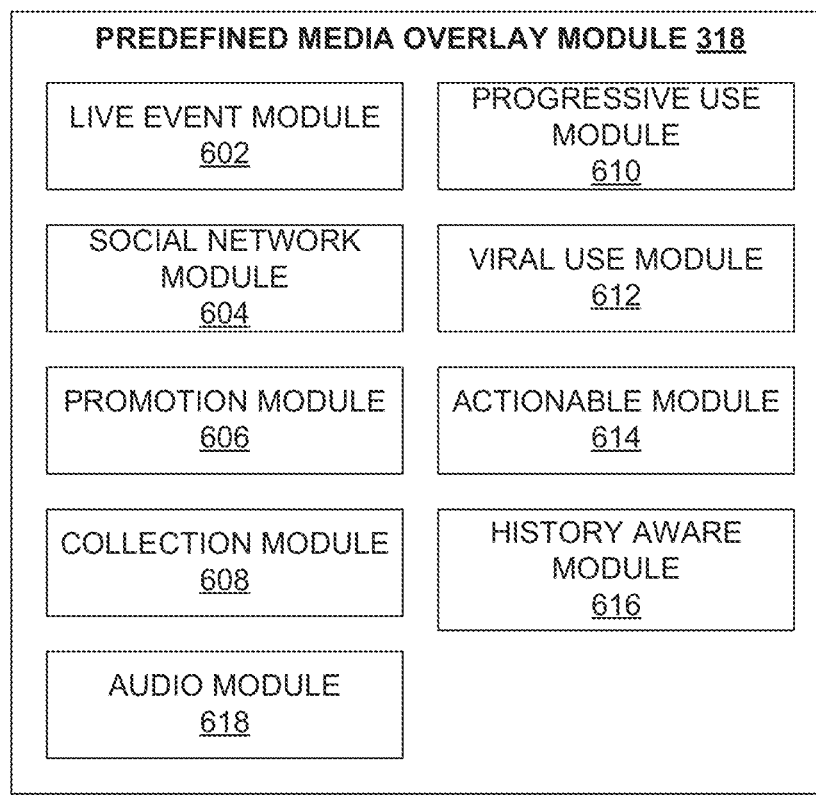
FIG. 6A shows a block diagram illustrating one example embodiment of a predefined media overlay module.

FIG. 6A shows a block diagram illustrating one example embodiment of the predefined media overlay module 318. The predefined media overlay module 318 includes, for example, a live event module 602, a social network module 604, a promotion module 606, a collection module 608, a progressive use module 610, a viral use module 612, an actionable module 614, a history aware module 616, and an audio module 618.

The live event module 602 generates a media overlay based on live event information. The live event information may be related to a live game score of a sporting event associated with a corresponding geolocation, or a live news event related to an entertainment (e.g., concert) or social event associated with a corresponding geolocation. For example, a user of the client device 110 attends a live sporting event (e.g., a game) at a stadium. As such, media metadata from the client device 110 may identify the location of the stadium with a date and time. The live event module 602 uses that information to search for a live event associated with the location of the stadium, date, and time. The live event module 602 retrieves a current or nearly current game score associated with the live sporting event at the stadium (e.g., via the ESPN API). The live event module 602 may also retrieve insignias or team logos associated with the live sporting event. As such, the live event module 602 generates a media overlay containing the latest score based on news sources covering the live sporting event.

In another example, the user of the client device 110 attends a live social event at a venue. Similarly, media metadata identifies the location of the venue with a date and time. The live event module 602 uses that information to search for a live event associated with the location of the venue, date, and time from sources such as a social network server or news media service. The live event module 602 retrieves a news feed associated with the live social event at the venue. As such, the live event module 602 generates a media overlay containing information or content based on news retrieved from a news feed associated with the live social event at the venue.

The social network module 604 generates a media overlay based on social network information of a user of the client device 110. The social network information may include social network data retrieved from a social network service provider. The social network data may include profile data of the user, "likes" of the user, establishments that the user follows, friends of the user, and postings of the user, among others. For example, the media overlay associated with a restaurant may be available to the user at the location of the restaurant if the user has identified himself as a fan of the restaurant or indicates a "like" of the restaurant with the social network service provider. In another example, the ranking or priority of displaying the media overlay in the client device 110 of the user may be based on the profile of the user or the number of "check-ins" of the user at the restaurant.

In another example embodiment, the media overlay may be restricted and available only to the user and the social network (e.g., friends or other users in different categories) of the user of the client device 110. As such, the user may forward the media overlay to his friends.

The promotion module 606 generates media overlays for a promotion (e.g., a game, contest, lottery). For example, a set of unique media overlays may be generated. One media overlay from the set of unique media overlays may be provided to the client device 110 when the client device 110 is at a predefined location associated with the media overlays or when an object (e.g., name, logo, product, etc.) is recognized in a photograph or video taken by the user. For example, the user may visit a fast food restaurant. The media metadata from the client device 110 identifies the location of the fast food restaurant. The promotion module 606 retrieves a unique media overlay from the set of unique media overlays and provides it to the client device 110. The promotion module 606 may remove the unique media overlay from the set of unique media overlays after it has been provided to the client device 110. In another embodiment, the promotion module 606 removes the unique media overlay from the set of unique media overlays after it has been provided to other client devices for a predefined number of times.

In another example, a promotional media overlay may be generated based on occurrences in another application (e.g., communicated to the media overlay application 122 via an API). For example, the media overlay may be an image of a character from a video game provided to the client device 110, or made available to a user, when the user completes a level in the video game. The media overlay may be available for a single use, multiple uses, for a period of time, or indefinitely.

In another example, a media overlay may be provided to the client device 110 or made available to a user based on another account that the user has linked with the media overlay application (e.g., via an account associated with the media overlay application). For example, the user may have an Xbox account that is linked to the user's account for the media overlay application. The user may be a first user and the first user may beat a second user on Xbox (e.g., playing a football game). The game or application on the Xbox may communicate the fact that the first user beat the second user on Xbox to the media overlay application 122 (e.g., via an API). A media overlay may be generated and provided to the client device 110 or made available to the first user, that includes information regarding the first user beating the second user. For example, the media overlay may include the fact that the first user beat the second user, the score, the overall record of the first user vs. the second user, etc.

In another example, a user may have linked a frequent flier account (e.g., an American Airlines account) to the media overlay application. When the user is boarding an airplane for a flight or is on a flight associated with the frequent flier account (e.g., on American Airlines flight number 10 from LAX to JFK), the user may receive a media overlay associated with the flight. For example, the user may receive a media overlay that includes the airlines logo, the flight route, the departure and arrival time, a decorative image of the departure and arrival cities (e.g., Los Angeles and New York), etc.

The media overlay includes content related to a game or promotion. In another example, the media overlay may include dynamic content adjusted based on the game or promotion. For example, the dynamic content may include a current number of remaining media overlays of the game or promotion. The media overlays from the promotion module 606 may be "collected" by the client device 110. For example, the client device 110 may store the media overlay in a collection at the client device 110. A prize may be redeemed upon collection of each overlay of a predefined set of media overlays.

The collection module 608 generates collectible media overlays. For example, the client device 110 is provided with a media overlay associated with the geolocation of the client device 110. The media overlay may be collected by the client device 110 and be made permanently available to the client device 110. The client device 110 may store the collected media overlay in a collection folder at the client device 110.

The progressive use module 610 generates media overlays with dynamic content that changes based on a number of uses of the media overlays. For example, a media overlay can be set to be used for a limited number of times. Every time the media overlay is provided to a client device, a content of the media overlay is adjusted. For example, the media overlay may include a fundraising progress bar in which a level of the bar rises every time the media overlay is used. The dynamic content in the media overlay may include a countdown displaying the number of remaining usages of the media overlay.

The viral use module 612 generates media overlays that can be forwarded to other users outside a geolocation associated with the media overlays. For example, the client device 110 receives a media overlay based on a geolocation of the client device 110. The client device 110 can send the media overlay to the client device 112 that is outside the geolocation of the client device 110. The forwarded media overlay may be available for use by the client device 112 for a predefined time limit (e.g., one hour). Similarly, the client device 112 may forward the media overlay to other client devices outside the geolocation of the client device 110 for use within the predefined time limit.

The actionable module 614 generates media overlays with an action associated with a content item of the media overlays. For example, the media overlay can start a browser of the client device 110 and open a predetermined website in the browser. In another embodiment, the media overlay is capable of opening other functionalities (e.g., a payment application) or executing other programs at the client device 110. For example, a user can tap on the media overlay to download or display a coupon associated with the media overlay at the client device 110.

The history aware module 616 generates media overlays based on geolocation of the client device 110 and historical events associated with the geolocation. For example, a media overlay may include pictures of a pyramid associated with the geolocation of the client device 110. The media overlays may be collected based on the historical events or, for example, for each of the Seven Natural Wonders of the World. For example, a media overlay associated with a national park may be collected when the user visits the national park. The client device 110 can collect all media overlays associated with all national parks.

The audio module 618 generates media overlays based on audio content (e.g., an audio track) associated with a content item received from a client device 110. For example, a media overlay may include one or more of a title associated with the audio content, an artist name associated with the audio content, an album name associated with the audio content, album artwork associated with the audio content, lyrics associated with the audio content, etc. In another embodiment, the media overlay is capable of opening other functionalities (e.g., to buy the song associated with the audio content, to get more information about the song, etc.). For example, a user can tap on the media overlay to download or display a coupon associated with the media overlay at the client device 110.

Figure 6B:
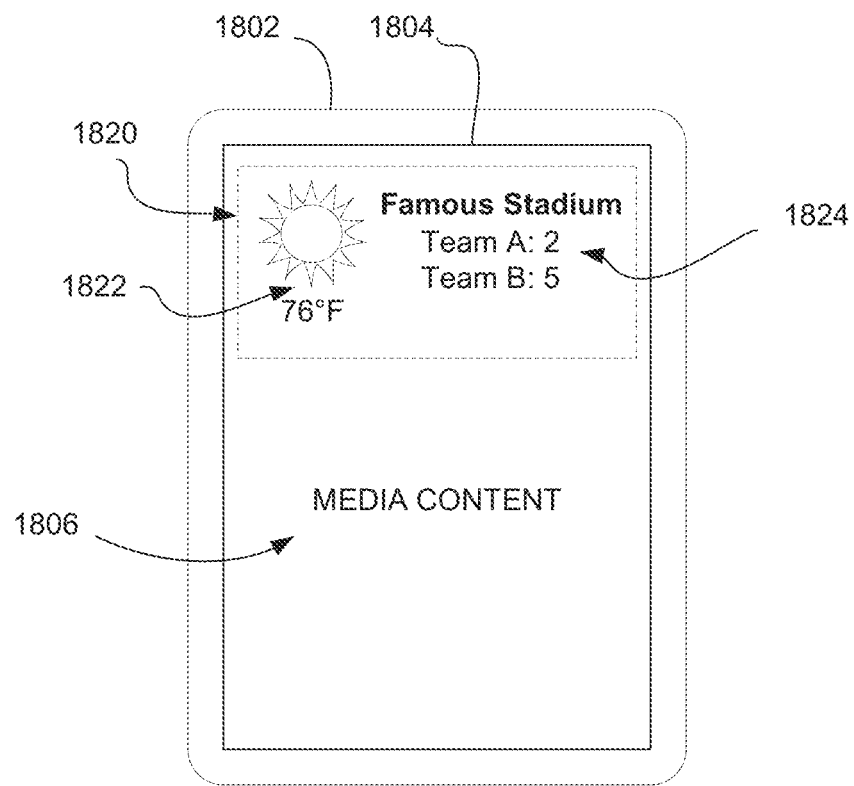
FIG. 6B shows a diagram illustrating an example of a media overlay with live data content.

FIG. 6B shows a diagram illustrating an example of a media overlay 1820 with live data content. The media overlay 1820 contains live data associated with a geolocation of the mobile device 1802. For example, the live data contains a live weather status 1822 and a latest score update 1824 of a sporting event associated with the geolocation of the mobile device 1802. The mobile device 1802 displays the media overlay 1820 on top of (e.g., as a transparent overlay) the media content 1806 on the display 1804. In one example embodiment, the media overlay 1820 may be implemented with the live event module 602 of FIG. 6A.

Figure 6C:
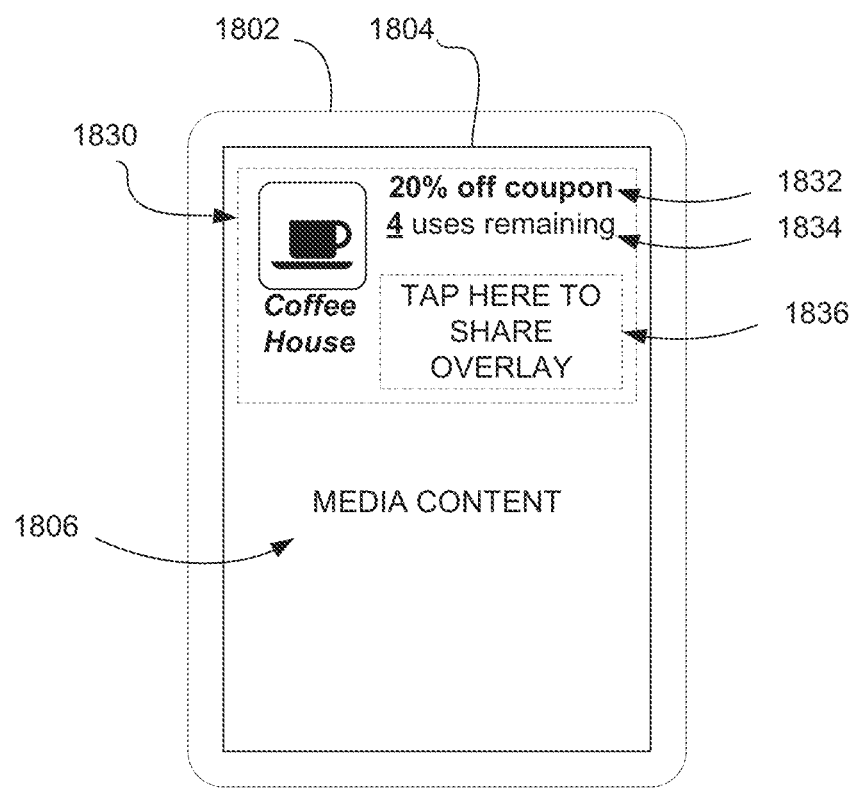
FIG. 6C shows a diagram illustrating an example of a media overlay with promotional content.

FIG. 6C shows a diagram illustrating an example of a media overlay 1830 with promotional content. For example, the media overlay 1830 includes a digital coupon 1832 that can be redeemed at a coffee shop. The media overlay 1830 may include dynamic content 1834. For example, the dynamic content 1834 may include a remaining number of times the coupon can be used. Furthermore, the media overlay 1830 may include an actionable area 1836 that is associated with an executable function. For example, when the user taps the actionable area 1836, the media overlay 1830 is forwarded to a mobile device of a friend of the user. The mobile device 1802 displays the media overlay 1830 on top of the media content 1806 on the display 1804. In one example embodiment, the media overlay 1830 may be implemented with the social network module 604, the promotion module 606, the progressive use module 610, and the actionable module 614 of FIG. 6A.

Figure 6D:
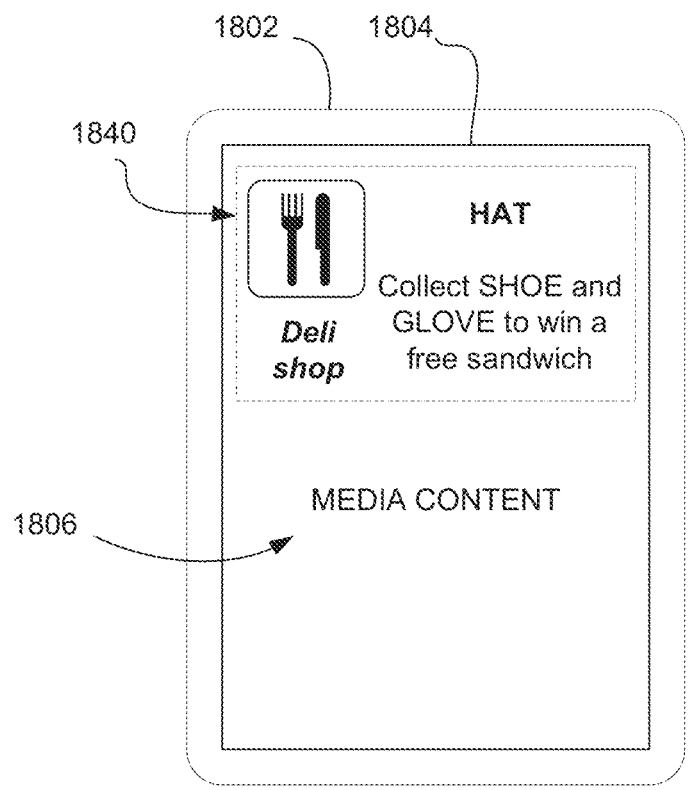
FIG. 6D shows a diagram illustrating an example of a collectible media overlay.

FIG. 6D shows a diagram illustrating an example of a collectible media overlay 1840. The collectible media overlay 1840 may be randomly supplied to the mobile device 1802 in response to detecting the mobile device 1802 at a geolocation associated with the collectible media overlay 1840. The collectible media overlay 1840 can be stored at the mobile device 1802. Once the mobile device 1802 detects that related collectible media overlays have been stored, the mobile device 1802 may cause the related collectible media overlays or a corresponding unique media overlay to be displayed in the display 1804. The mobile device 1802 displays the media overlay 1840 on top of the media content 1806 on the display 1804. In one example embodiment, the media overlay 1840 may be implemented with the collection module 608 of FIG. 6A.

Figure 6E:
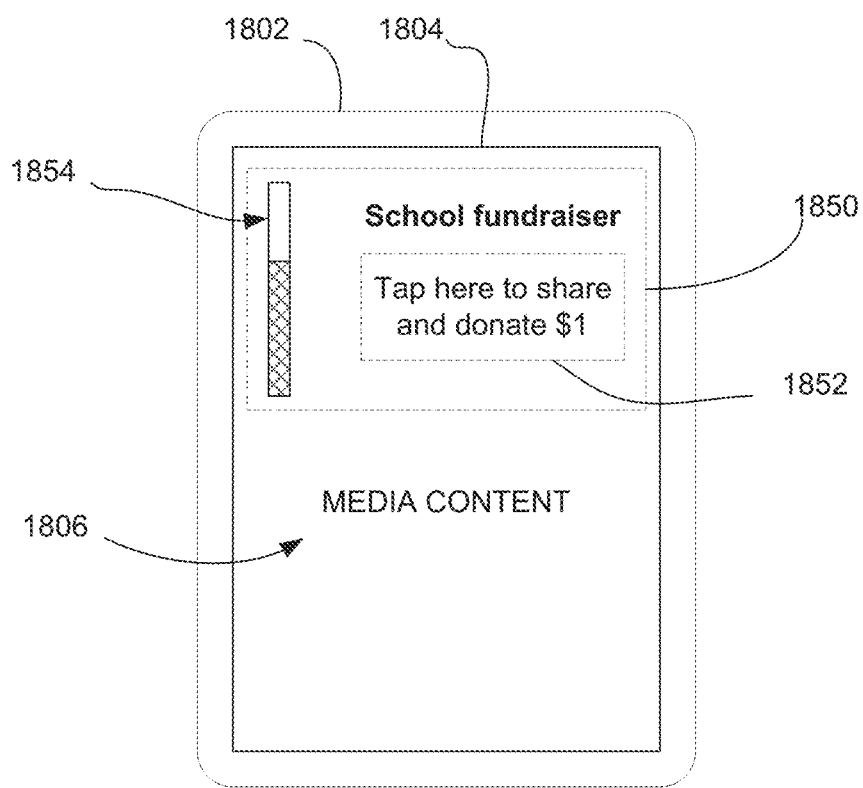
FIG. 6E shows a diagram illustrating an example of a media overlay with viral content.

FIG. 6E shows a diagram illustrating an example of a viral media overlay 1850. The viral media overlay 1850 may include dynamic content 1854 and an actionable area 1852. For example, the dynamic content 1854 shows a progress bar and a goal of a fundraising event. The progress bar is adjusted based on a latest amount raised. The actionable area 1852 may trigger the mobile device 1802 to cause a financial transaction (e.g., donation) and a communication to another mobile device (e.g., message to another mobile device using the messaging application 120). The mobile device 1802 displays the viral media overlay 1850 on top of the media content 1806 on the display 1804. In one example embodiment, the viral media overlay 1850 may be implemented with the progressive use module 610, the viral use module 612, and an actionable module 614 of FIG. 6A.

Figure 6F:
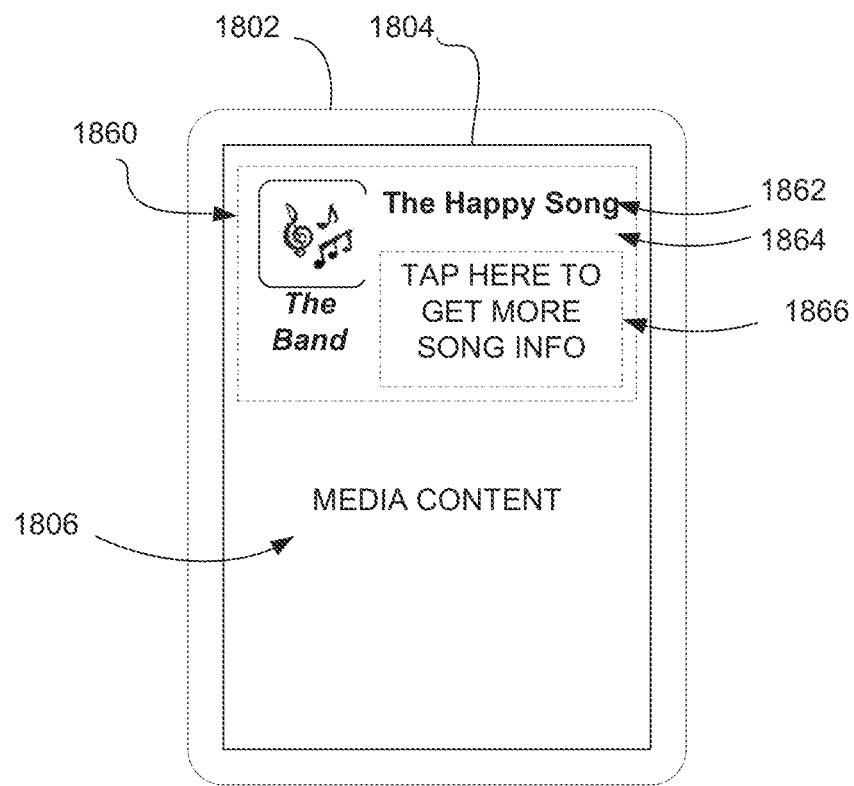
FIG. 6F shows a diagram illustrating an example of a media overlay with audio content.

FIG. 6F shows a diagram illustrating an example of a media overlay 1860 with audio content. The media overlay 1860 may include dynamic content 1864 that includes, for example, a song title 1862 and a band name. The dynamic content 1864 may also include an actionable area 1866. The actionable area 1866 may provide additional information about the song, how to buy the song, etc. The mobile device 1802 may display the media overlay 1860 on top of the media content 1806 (e.g., content item) on the display 1804. In one example, the media overlay 1860 may be implemented with the audio module 618 and the actionable module 614 of FIG. 6A. In the alternative, or in addition, the actionable area 1866 may be in another location (e.g., below the media content 1806). In another example, a user gesture (e.g., a finger swipe upwards on the media content 1806), may cause an action to occur (e.g., buy the song, listen to the full track, learn more about the artist, etc.).

Figure 7:
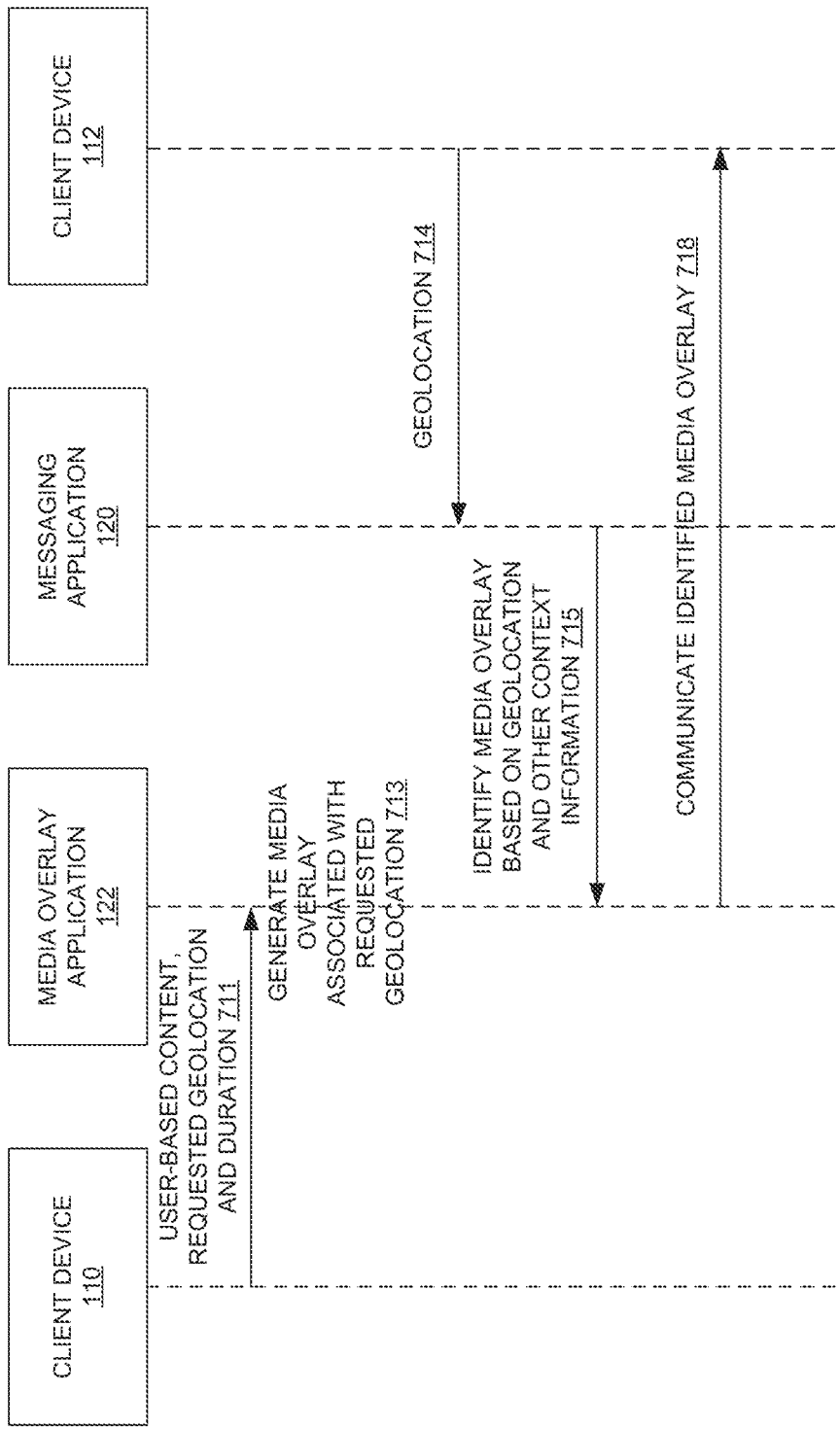
FIG. 7 shows an interaction diagram illustrating one example embodiment of an operation of the user-based media overlay publication module.

FIG. 7 shows an interaction diagram illustrating one example embodiment of an operation of the user-based media overlay publication module 314. At operation 711, the client device 110 of a first user uploads content and sends a requested geolocation and a requested time duration to the media overlay application 122. At operation 713, the media overlay application 122 generates a media overlay based on the uploaded content and associates the media overlay with the requested geolocation for the requested time duration. In one example embodiment, operations 711 and 713 may be implemented with the user-based media overlay publication module 314 of FIG. 3.

At operation 714, the client device 112 of a second user sends geolocation information to the messaging application 120. At operation 715, the messaging application 120 identifies, from the media overlay application 122, a media overlay based on the geolocation information of the client device 112. At operation 718, the media overlay application 122 supplies the client device 112 with the identified media overlay. In one example embodiment, operations 716 and 718 may be implemented with the media overlay engine 306 of FIG. 3.

Figure 8:
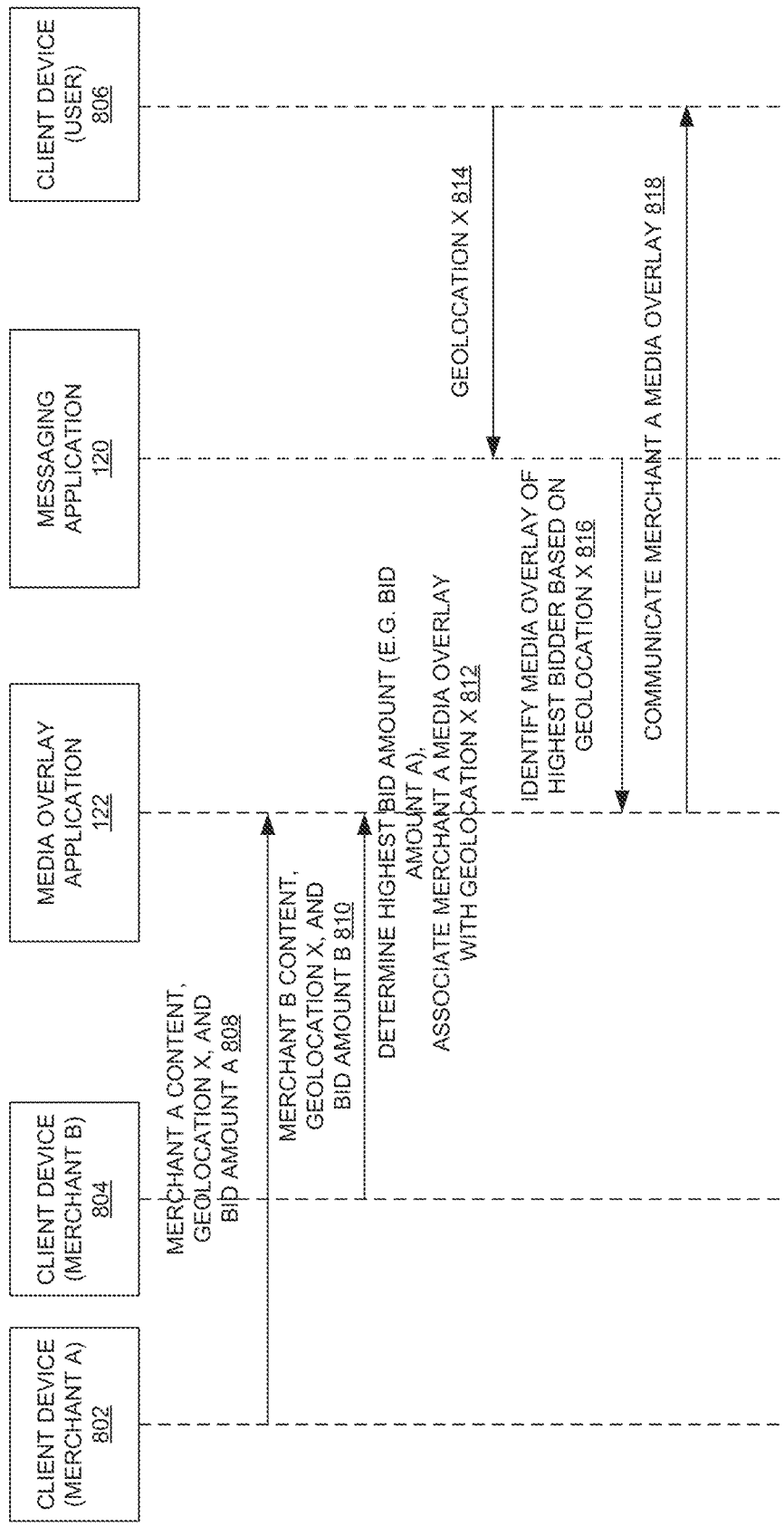
FIG. 8 shows an interaction diagram illustrating an example embodiment of an operation of the merchant-based media overlay publication module.

FIG. 8 shows an interaction diagram illustrating an example embodiment of an operation of the merchant-based media overlay publication module 316. At operation 808, a client device 802 of merchant A uploads content with geolocation information (e.g., geolocation X) and a bid amount (e.g., bid amount A) to the media overlay application 122 to form media overlay A. At operation 810, a client device 804 of merchant B uploads content with the same geolocation information (e.g., geolocation X) and a bid amount (e.g., bid amount B) to the media overlay application 122 to form media overlay B. At operation 812, the media overlay application 122 determines a highest bidder, and associates the media overlay of the highest bidder with geolocation X. For example, if bid amount A is greater than bid amount B, media overlay A is provided to client devices that are located at geolocation X. In one example embodiment, operations 808, 810, and 812 may be implemented with the merchant-based media overlay publication module 316 of FIG. 3.

At operation 814, a client device 806 at geolocation X sends its geolocation information to the messaging application 120. At operation 816, the messaging application 120 identifies, from the media overlay application 122, the media overlay associated with the geolocation X. At operation 818, the media overlay application 122 supplies the client device 806 with media overlay A. In one example embodiment, operations 816 and 818 may be implemented with the media overlay engine 306 of FIG. 3. In another example embodiment, the media overlay application 122 supplies both media overlays A and B to the client device 806 with instructions for the client device 806 to display media overlay A first before media overlay B since merchant A was the highest bidder.

Figure 9:
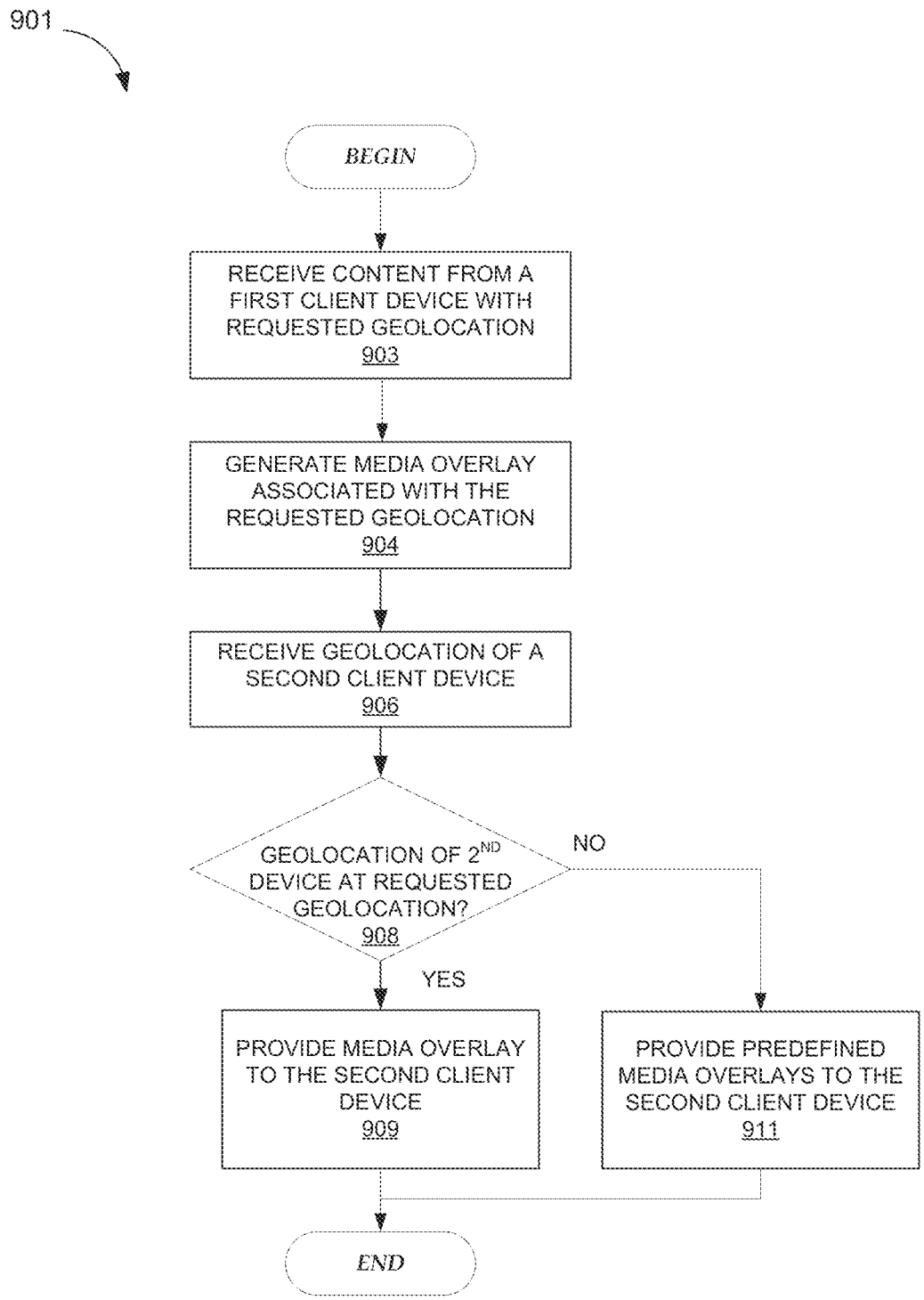
FIG. 9 shows a flow diagram illustrating one example embodiment of an operation of the user-based media overlay publication module.

FIG. 9 shows a flow diagram illustrating one example embodiment of a method 901 of the user-based media overlay publication module 314. At operation 903, the user-based media overlay publication module 314 receives uploaded content and a requested geolocation from a first client device. In one example embodiment, operation 903 may be implemented with the user-based content upload module 402, the user-based geolocation selection module 404, and the user-based duration selection module 406 of FIG. 4A.

At operation 904, the user-based media overlay publication module 314 forms a user-based media overlay that includes the uploaded content and is associated with the requested geolocation. In one example embodiment, operation 904 may be implemented with the user-based publication engine 408 of FIG. 4A.

At operation 906, the user-based media overlay publication module 314 receives geolocation information from a second client device. At operation 908, the user-based media overlay publication module 314 determines whether the geolocation of the second client device is within the requested geolocation from the first client device. At operation 909, the user-based media overlay publication module 314 publishes the user-based media overlay from the first client device to the second client device in response to the geolocation of the second client device being within the requested geolocation from the first client device. In one example embodiment, operation 909 may be implemented with the user-based media overlay module 320 of FIG. 3.

At operation 911, the media overlay engine 306 supplies predefined media overlays corresponding to the geolocation of the second client device to the second client device, in response to the geolocation of the second client device not being within the requested geolocation from the first client device. In one example embodiment, operation 911 may be implemented with the predefined media overlay module 318 of FIG. 3.

Figure 10:
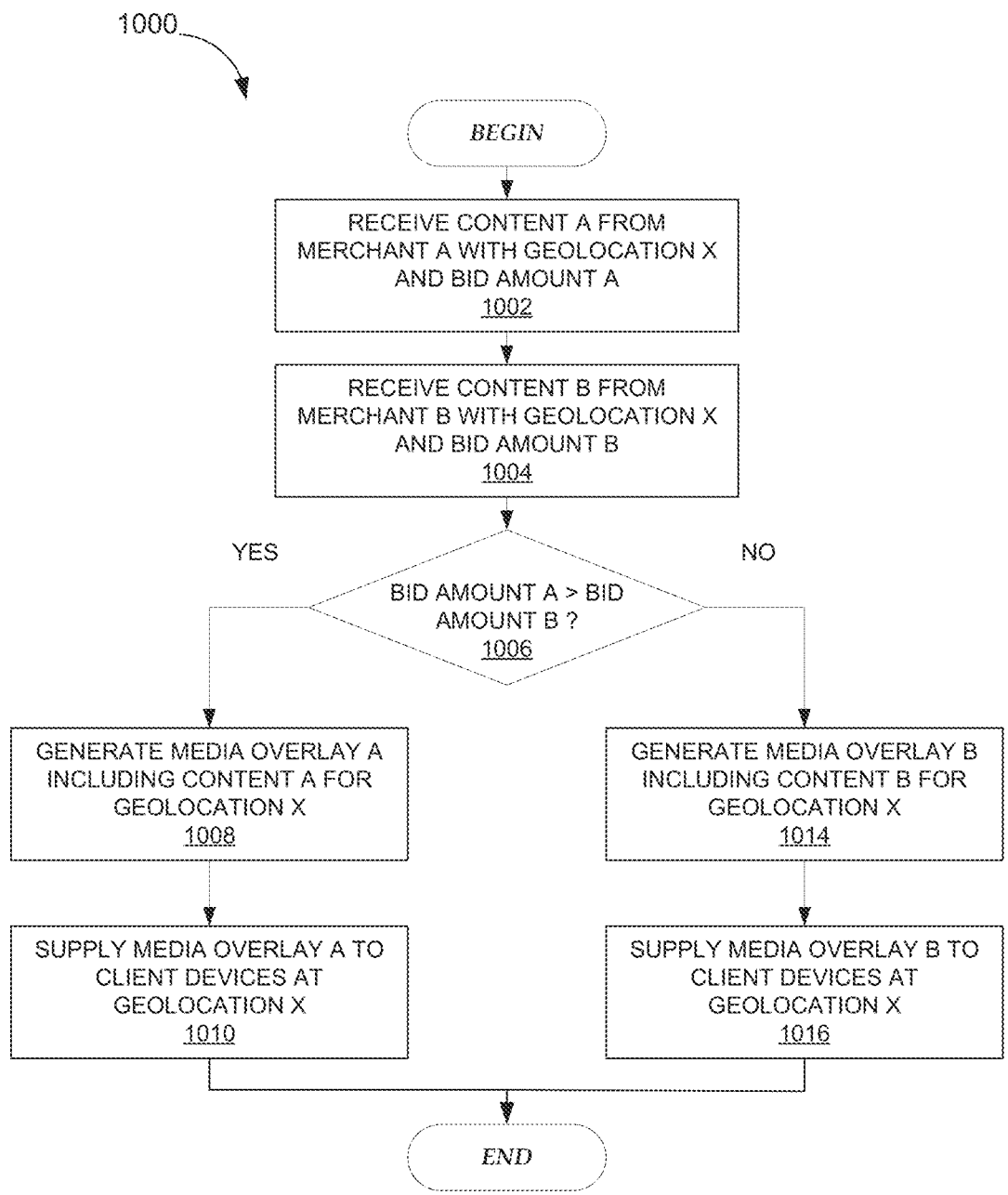
FIG. 10 shows a flow diagram illustrating one example embodiment of an operation of the merchant-based media overlay publication module.

FIG. 10 shows a flow diagram illustrating one example embodiment of a method 1000 of operation for the merchant-based media overlay publication module 316. At operations 1002 and 1004, the merchant-based media overlay publication module 316 receives uploaded content, geolocation information, and corresponding bid amounts from merchants. For example, at operation 1002, the merchant-based content upload module 502 receives content A from merchant A. The merchant-based geolocation selection module 504 receives geolocation X from merchant A. The merchant-based bidding module 508 receives bid amount A from merchant A.

At operation 1004, the merchant-based content upload module 502 receives content B from merchant B. The merchant-based geolocation selection module 504 receives geolocation X from merchant B. The merchant-based bidding module 508 receives bid amount B from merchant B.

At operation 1006, the highest bid amount is determined. In one example embodiment, operation 1006 may be implemented with the merchant-based bidding module 508 of FIG. 6A. If bid amount A is greater than bid amount B, the merchant-based publication engine 510 generates a merchant-based media overlay A based on content A and geolocation X at operation 1008. At operation 1010, the merchant-based media overlay module 322 supplies merchant-based media overlay A to client devices that are located at geolocation X.

If bid amount B is greater than bid amount A, the merchant-based publication engine 510 generates a merchant-based media overlay B based on content B and geolocation X at operation 1014. At operation 1016, the merchant-based media overlay module 322 supplies merchant-based media overlay B to client devices that are located at geolocation X.

Figure 11:
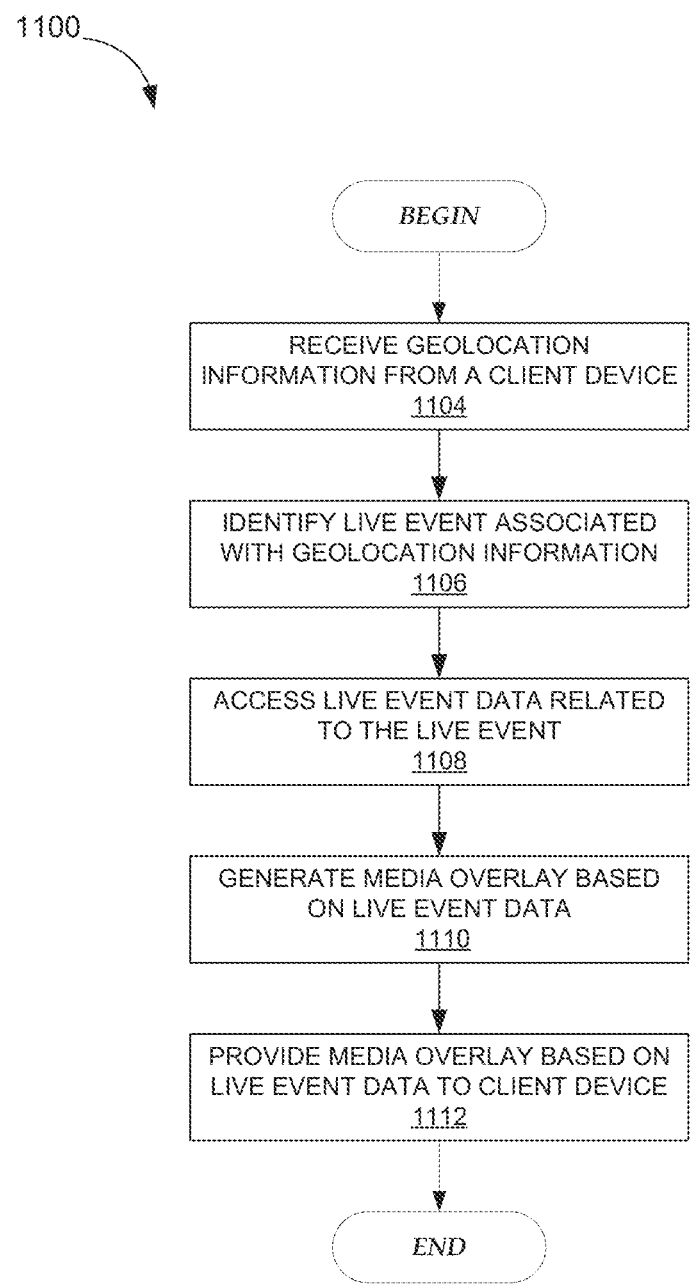
FIG. 11 shows a flow diagram illustrating one example embodiment of an operation of a live event module.

FIG. 11 shows a flow diagram illustrating one example embodiment of a method 1100 of operation for the live event module 602. At operation 1104, the live event module 602 receives geolocation information from a client device. At operation 1106, the live event module 602 identifies a live event associated with the geolocation information. At operation 1108, the live event module 602 accesses live event data related to the live event. At operation 1110, the live event module 602 generates a live event media overlay based on the live event data. At operation 1112, the live event module 602 supplies the live event media overlay to the client device.

Figure 12:
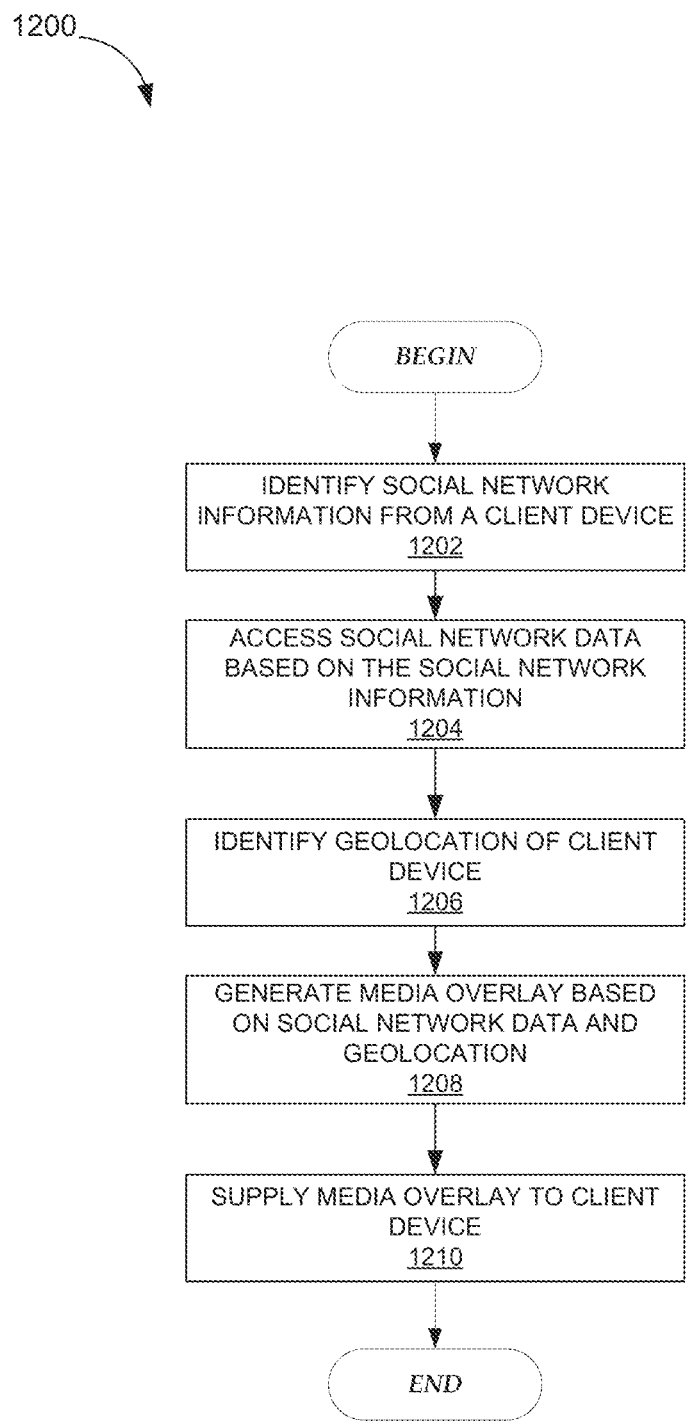
FIG. 12 shows a flow diagram illustrating one example embodiment of an operation of a social network module.

FIG. 12 shows a flow diagram illustrating one example embodiment of a method 1200 of operation for the social network module 604. At operation 1202, the social network module 604 receives social network information from a client device. At operation 1204, the social network module 604 accesses social network data from social network service providers based on the social network information from the client device. At operation 1206, the social network module 604 identifies a geolocation from geolocation information of the client device. At operation 1208, the social network module 604 generates a social network-based media overlay based on the social network data and geolocation of the client device. At operation 1210, the social network module 604 supplies the social network-based media overlay to the client device.

Figure 13:
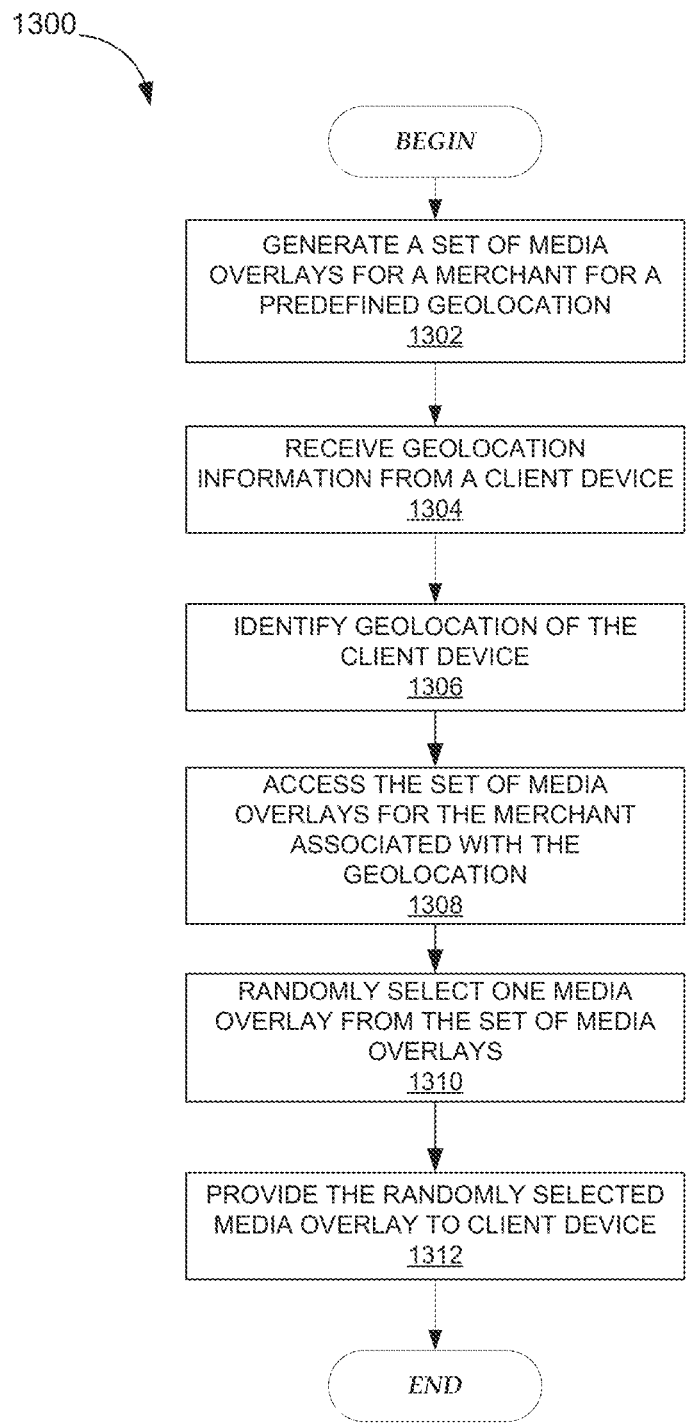
FIG. 13 shows a flow diagram illustrating one example embodiment of an operation of a promotion module.

FIG. 13 shows a flow diagram illustrating one example embodiment of a method 1300 of operation for the promotion module 606. At operation 1302, the promotion module 606 generates a set of media overlays for a merchant for a predefined geolocation. At operation 1304, the promotion module 606 receives geolocation information from a client device. At operation 1306, the promotion module 606 identifies the geolocation of the client device from the geolocation information. At operation 1308, the promotion module 606 accesses the set of media overlays for the merchant associated with the geolocation. At operation 1310, the promotion module 606 randomly selects at least one media overlay from the set of media overlays. At operation 1312, the promotion module 606 supplies the randomly selected media overlay(s) to the client device.

Figure 14:
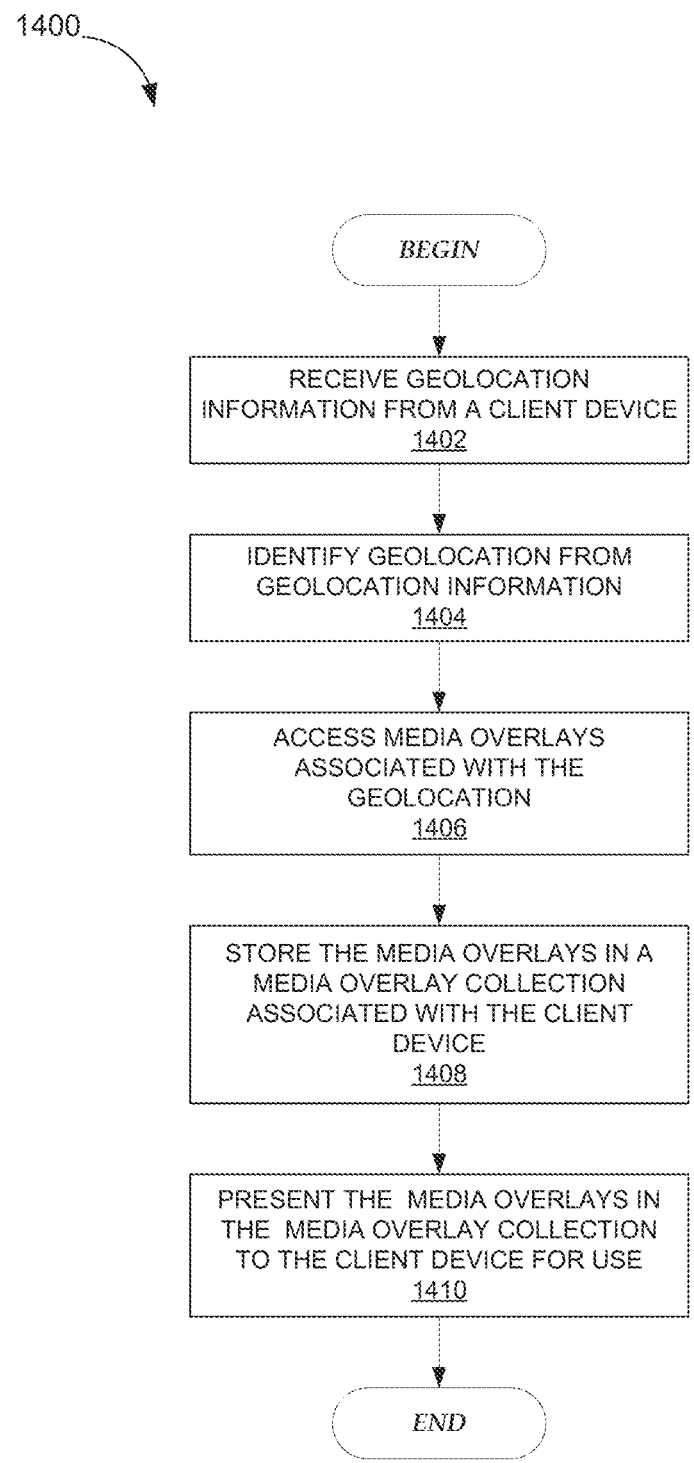
FIG. 14 shows a flow diagram illustrating one example embodiment of an operation of a collection module.

FIG. 14 shows a flow diagram illustrating one example embodiment of a method 1400 of operation for the collection module 608. At operation 1402, the collection module 608 receives geolocation information from a client device. At operation 1404, the collection module 608 determines the geolocation of the client device from the geolocation information. At operation 1406, the collection module 608 accesses media overlays associated with the geolocation of the client device. At operation 1408, the collection module 608 stores the media overlays in a media overlay collection associated with the client device. At operation 1410, the collection module 608 presents the media overlays in the media overlay collection to the client device for use.

Figure 15:
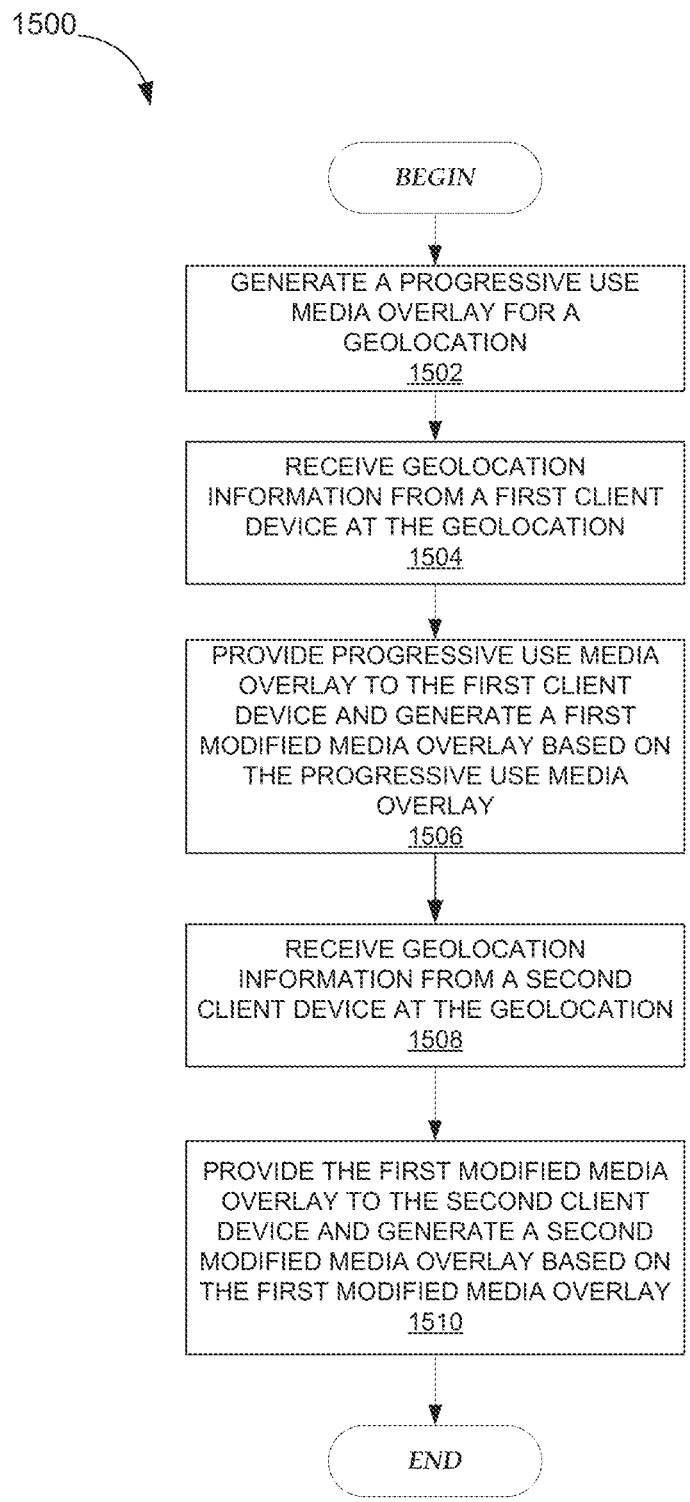
FIG. 15 shows a flow diagram illustrating one example embodiment of an operation of a progressive use module.

FIG. 15 shows a flow diagram illustrating one example embodiment of a method 1500 of operation for the progressive use module 610. At operation 1502, the progressive use module 610 generates a progressive use media overlay for a geolocation. At operation 1504, the progressive use module 610 receives geolocation information from a first client device at the geolocation. At operation 1506, the progressive use module 610 supplies the progressive use media overlay to the first client device, and generates a first modified media overlay based on the progressive use media overlay. At operation 1508, the progressive use module 610 receives geolocation information from a second client device at the geolocation. At operation 1510, the progressive use module 610 supplies the first modified media overlay to the second client device, and generates a second modified media overlay based on the first modified media overlay.

Figure 16:
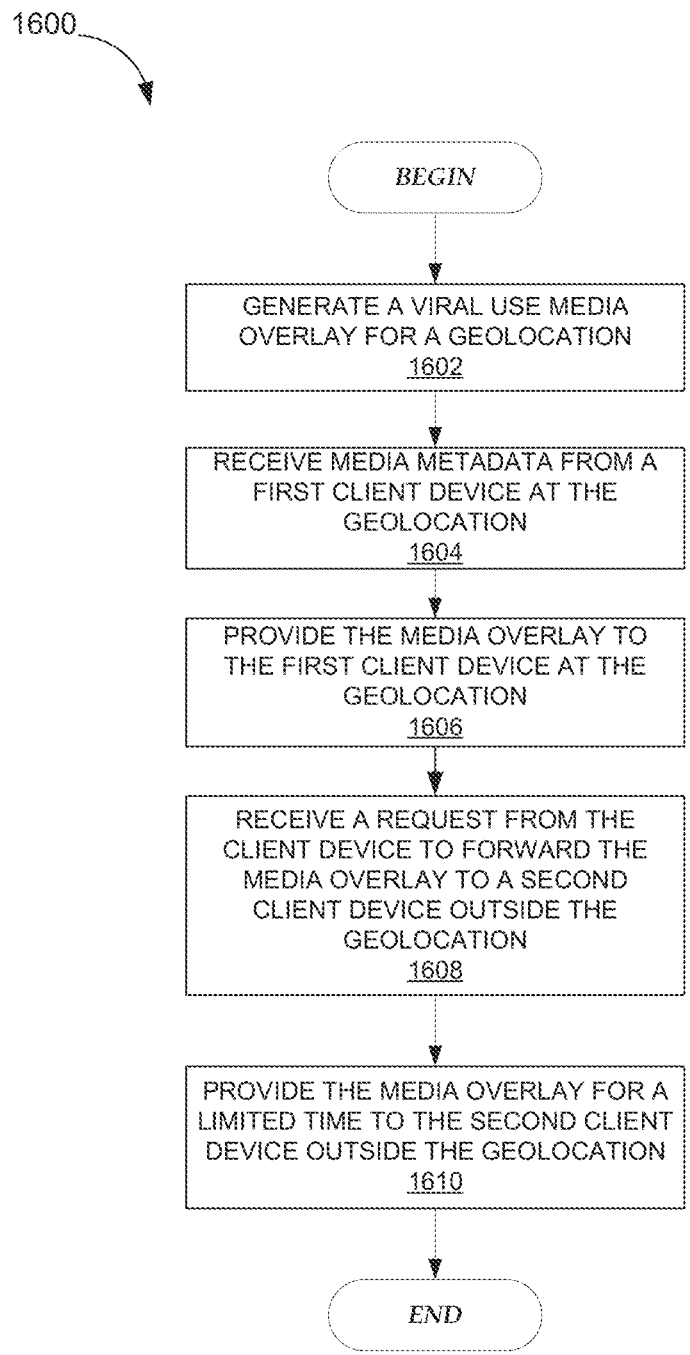
FIG. 16 shows a flow diagram illustrating one example embodiment of an operation of a viral use module.

FIG. 16 shows a flow diagram illustrating one example embodiment of a method 1600 of operation for the viral use module 612. At operation 1602, the viral use module 612 generates a media overlay for a geolocation. At operation 1604, the viral use module 612 receives media metadata from a first client device at the geolocation. At operation 1606, the viral use module 612 supplies the media overlay to the first client device at the geolocation. At operation 1608, the viral use module 612 receives a request from the first client device to forward the media overlay to a second client device outside the geolocation. At operation 1610, the viral use module 612 provides the media overlay for a limited time to the second client device outside the geolocation.

Figure 17:
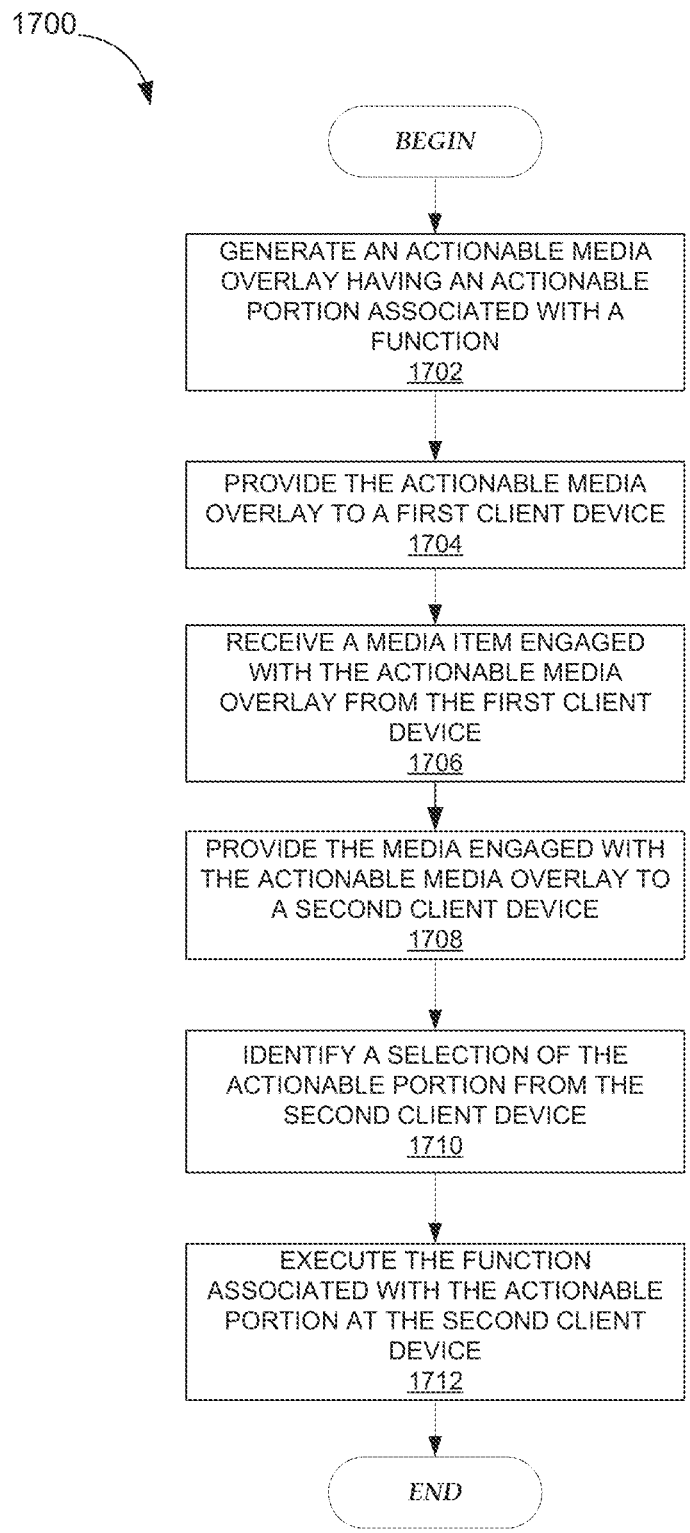
FIG. 17 shows a flow diagram illustrating one example embodiment of an operation of an actionable module.

FIG. 17 shows a flow diagram illustrating one example embodiment of a method 1700 of operation for the actionable module 614. At operation 1702, the actionable module 614 generates an actionable media overlay having an actionable portion associated with a function. At operation 1704, the actionable module 614 provides the actionable media overlay to a first client device. At operation 1706, the actionable module 614 receives a media item (e.g., a photo) with the media overlay from the first client device. At operation 1708, the actionable module 614 supplies the media item with the media overlay to a second client device. At operation 1710, the actionable module 614 identifies a selection of the actionable portion from the second client device. At operation 1712, the actionable module 614 executes a function associated with the actionable portion at the second client device.

Figure 18:
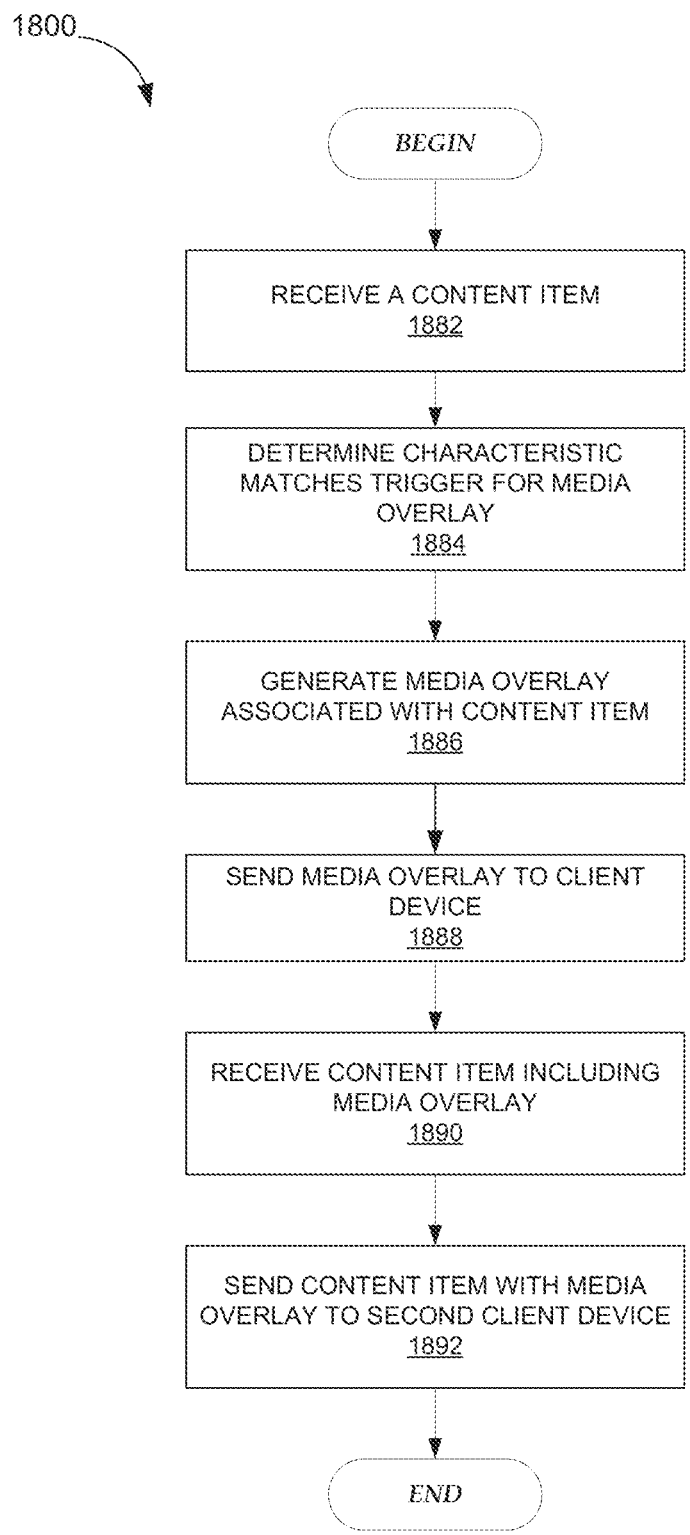
FIG. 18 shows a flow diagram illustrating one example embodiment of a media overlay publication module.

FIG. 18 shows a flow diagram illustrating one example embodiment of a method 1800 of operation for a media overlay publication module 304. At operation 1882, the media overlay publication module 304 may receive a content item (e.g., photograph, video, etc.) from a client device 110 (for example). For instance, a user of the client device 110 may be taking a photograph or a video using the client device 110. While the user is taking the photograph or video, or after the user has taken the photograph or video, the client device 110 may send a portion of the video, audio related to the photograph or video (e.g., playing in the background), or the captured photograph or video to the media overlay publication module 304.

At operation 1884, the media overlay publication module 304 may determine whether one or more characteristics of the content item match a trigger for a media overlay. Exemplary characteristics or triggers may include a geolocation associated with the content item or client device 110, audio content in the content item, a speed of the client device 110 based on movement data from the client device 110, a timestamp associated with the content item, data associated with a machine-readable code (e.g., a bar code, a QR code), an object in the content item, adding a new recipient for the content item, etc. If one or more characteristics of the content item match a trigger for a media overlay, at operation 1886 the media overlay publication module 304 may generate a media overlay associated with the content item. A media overlay may include a creative overlay, a geo lens, an audio filter, a music clip, creative tools, access to additional features or functionality, audio clips, etc.

For example, the media overlay publication module 304 may detect audio content in the content item and identify an audio track based on the audio content in the content item (e.g., matching a fingerprint of the audio content to known fingerprints to identify an audio track). The audio track may trigger generation of a media overlay associated with the audio track. A media overlay may be generated that includes at least one of a title associated with the audio track, an artist name associated with the audio track, an album name associated with the audio track, album artwork associated with the audio track, lyrics associated with the audio track, etc. (see, e.g., FIG. 6F).

The audio track may be playing at a live event, such as a concert, in one example. Different media overlays may be generated based on which band is playing at the concert, which song is playing, etc. For example, a media overlay may be generated that includes the particular song and band that is playing, the next song or band that will play, the previous song or band that played, a highlighted song and/or band amongst a list of songs and/or bands that are playing or will play during the course of the event, one or more timestamps for when the song is playing or will end, etc. The media overlay publication module 304 may use other information (e.g., schedule information) associated with the event to supplement the information received from the client device 110.

In another example, the media overlay may provide additional audio content to include with the content item. For example, the content item may include one or more photographs or video with a particular audio track playing in the background. The media overlay publication module 304 may identify the audio track as described above and provide a continuous version of the audio track set to the photograph(s) or video.

In another example, the media overlay publication module 304 may detect a particular object in the content item (e.g., in a photograph or video) and identify the object (e.g., using object recognition technology). A media overlay may be generated associated with the object. For example, a media overlay may be provided to the client device 110 in response to the user taking a photograph or video of a certain object (e.g., an incentive or reward for taking the photograph or video). The media overlay may be related to the object or have further information about the object. For example, the media overlay publication module 304 may recognize an object indicating that the user is at Disneyland and present a Disney-themed media overlay. In another example, the media overlay publication module 304 may recognize an object such as a logo, brand name, product, particular person (e.g., celebrity), etc.

In another example, the media overlay publication module 304 may detect data from a machine-readable code (e.g., barcode, QR code, etc.) in the content item. A media overlay may be created or selected based on the code provided. For example, a machine-readable code may be created for a musical artist and a media overlay may be created for the musical artist. A user may use the client device 110 to scan the machine-readable code related to the musical artist and the media overlay publication module 304 may generate the media overlay associated with the musical artist. Additionally or alternatively, additional accessories or features (e.g., tools for editing photographs or video, etc.) may be provided to a user.

In another example, the media overlay publication module 304 may detect a geolocation associated with the content item and generate a media overlay associated with that geolocation (e.g., a media overlay with a real-time score of a game, a media overlay of concert information, etc.), as discussed in further detail above.

At operation 1888, the media overlay publication module 304 may send the media overlay to the client device 110. The media overlay may be displayed on the client device 110 (e.g., overlaid on the photograph or image), or a notification may be displayed to the user indicating that one or more media overlays are available for the photograph or video (e.g., audio media overlay, creative tool, etc.) The user may access the one or more media overlays by interacting with the client device 110 (e.g., pressing a button, long pressing the screen, swipe or other gesture, etc.). In addition, or alternatively, the media overlay may be already stored locally on the client device 110 and the media overlay publication module 304 may send an indication to the client device 110 to "unlock" the media overlay to provide to a user.

The user may select to use the media overlay and then send the content item including the media overlay to one or more recipients. The media overlay publication module 304 may receive the content item including the media overlay in operation 1890. The media overlay publication module 304 may send the content item with the media overlay to a second client device 112 (or one or more client devices) at operation 1892. The content item with the media overlay may be displayed on the second client device 112.

Before sending the content item with the media overlay to the second client device, the media overlay publication module 304 may generate a second media overlay for the content item. The media overlay publication module 304 may send the content item with the media overlay (e.g., the first media overlay) and the second media overlay to the second client device 112. For example, the first media overlay may include audio track information, and the second media overlay may include a link or shortcut to other information about the audio track (e.g., detail about the track, artist, album, or lyrics, how to buy the audio track or album, etc.) that can be displayed and/or accessed by a user of the second client device. In one example, the second media overlay may be an actionable media overlay as described above.

Characteristics of a content item may trigger other things in addition to or instead of a media overlay. For example, geolocation information indicating that a user is in a particular store may trigger access to a particular eCommerce store related to the physical store the user has entered.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Figure 19:
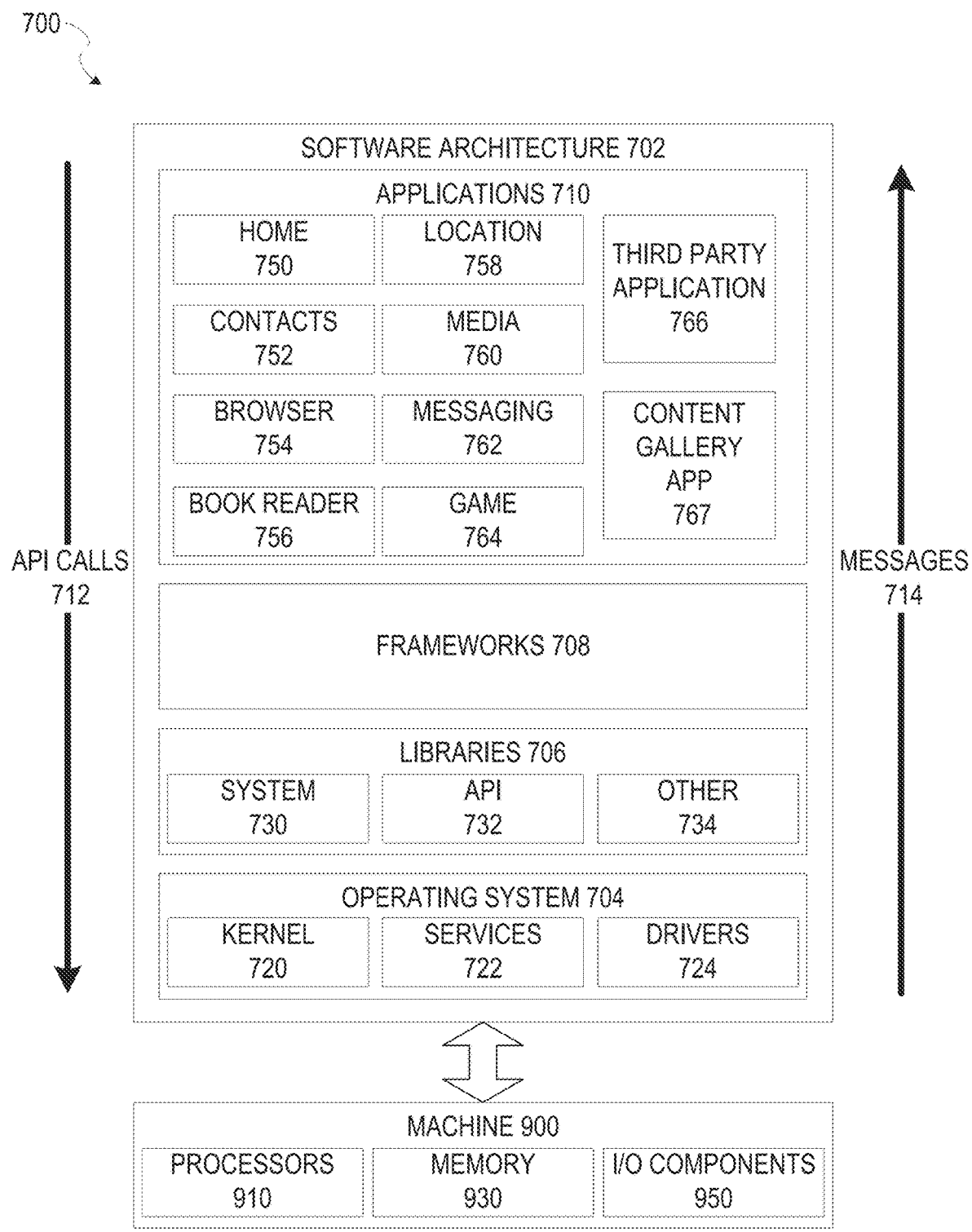
FIG. 19 is a block diagram illustrating an example of a software architecture that may be installed on a machine, according to some example embodiments.

FIG. 19 is a block diagram 700 illustrating an architecture of software 702, which can be installed on any one or more of the devices described above. For example, in various embodiments, the client devices 110 and 112 and the data exchange platform 102 (e.g., application server 118, database server 124, etc.) may be implemented using some or all of the elements of the software 702. FIG. 19 is merely a non-limiting example of a software architecture, and it will be appreciated that many other architectures can be implemented to facilitate the functionality described herein. In various embodiments, the software 702 is implemented by hardware such as a machine 900 of FIG. 20 that includes processors 910, memory 930, and I/O components 950. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a content gallery application 767. In certain embodiments, this may be a standalone application that operates to manage communications with a server system such as the data exchange platform 102. In other embodiments, this functionality may be integrated with another application, such as the media application 760 or another such application. The content gallery application 767 may manage collection of content using a camera device of the machine 900, communication with a server system via the I/O components 950, and receipt and storage of received content in the memory 930. Presentation of content and user inputs associated with content may be managed by the content gallery application 767 using different frameworks 708, library 706 elements, or operating system 704 elements operating on the machine 900.

Figure 20:
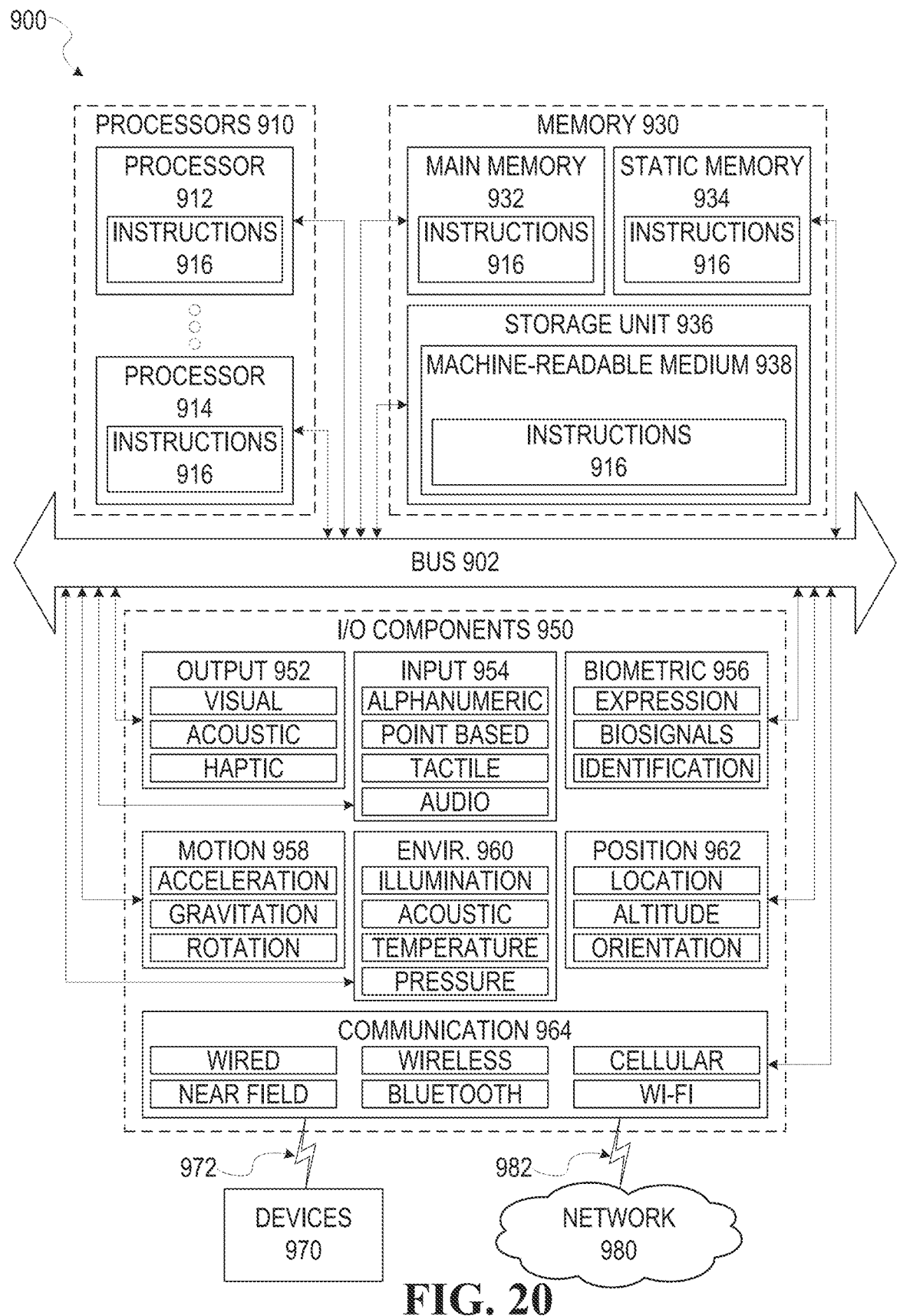
FIG. 20 illustrates a diagrammatic representation of a machine in the form of a computer system within which a set of instructions may be executed for causing the machine to perform any one or more of the methodologies discussed herein, according to an example embodiment.

FIG. 20 is a block diagram illustrating components of a machine 900, according to some embodiments, able to read instructions from a machine-readable medium (e.g., a machine-readable storage medium) and perform any one or more of the methodologies discussed herein. Specifically, FIG. 20 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine (e.g., application server 118, database server 124) or a client device 110, 112 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 19 shows multiple processors 910, the machine 900 may include a single processor 910 with a single core, a single processor 910 with multiple cores (e.g., a multi-core processor 910), multiple processors 912, 914 with a single core, multiple processors 912, 914 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 20. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Figure 21:
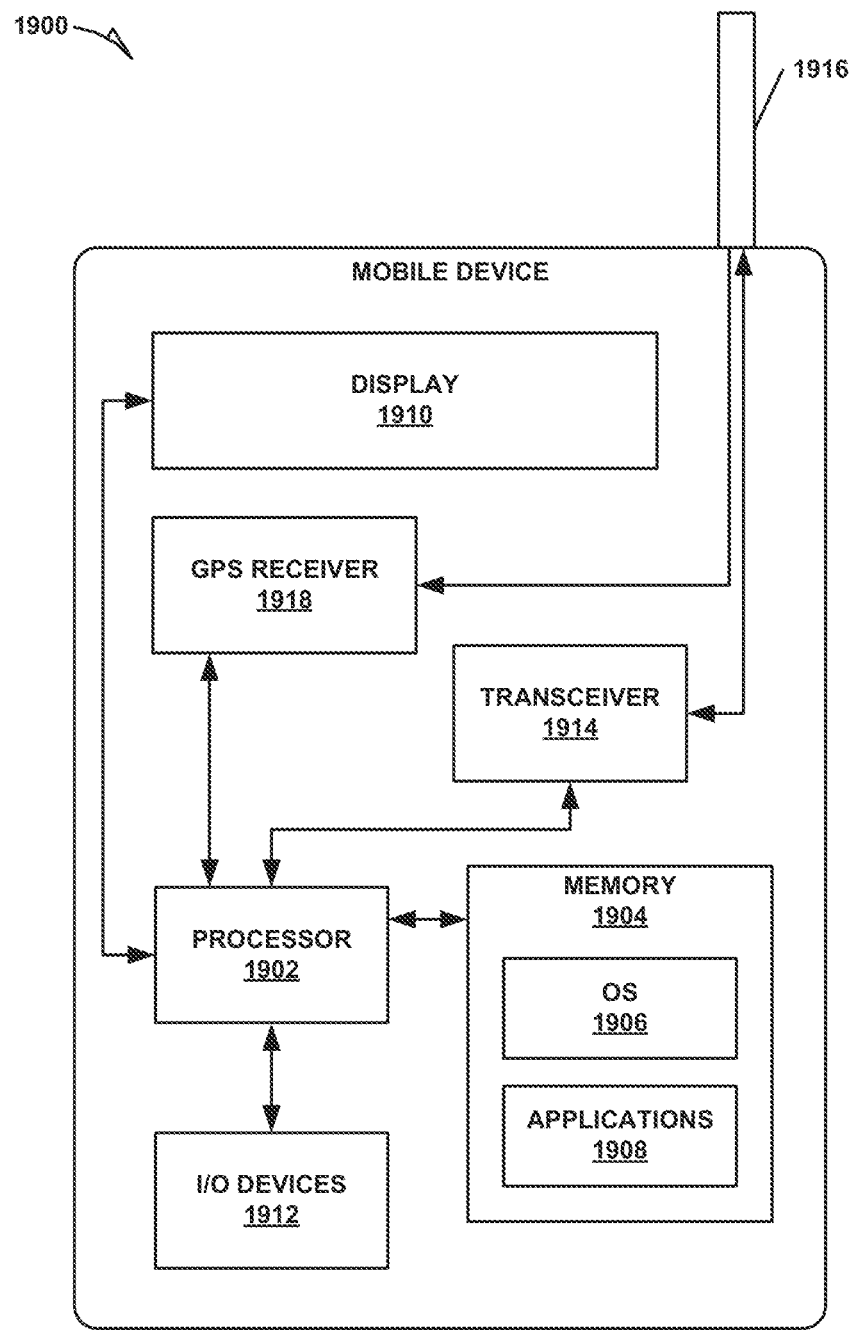
FIG. 21 is a block diagram illustrating a mobile device, according to an example embodiment.

FIG. 21 is a block diagram illustrating an exemplary mobile device 1900, according to an example embodiment. The mobile device 1900 may include a processor 1902. The processor 1902 may be any of a variety of different types of commercially available processors 1902 suitable for mobile devices 1900 (for example, an XScale architecture microprocessor, a microprocessor without interlocked pipeline stages (MIPS) architecture processor, or another type of processor 1902). A memory 1904, such as a random access memory (RAM), a flash memory, or another type of memory, is typically accessible to the processor 1902. The memory 1904 may be adapted to store an operating system (OS) 1906, as well as applications 1908, such as a mobile location enabled application that may provide location-based services (LBSs) to a user. The processor 1902 may be coupled, either directly or via appropriate intermediary hardware, to a display 1910 and to one or more input/output (I/O) devices 1912, such as a keypad, a touch panel sensor, a microphone, and the like. Similarly, in some embodiments, the processor 1902 may be coupled to a transceiver 1914 that interfaces with an antenna 1916. The transceiver 1914 may be configured to both transmit and receive cellular network signals, wireless data signals, or other types of signals via the antenna 1916, depending on the nature of the mobile device 1900. Further, in some configurations, a GPS receiver 1918 may also make use of the antenna 1916 to receive GPS signals.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
receiving from a first client device, at a server computer associated with a media overlay publication system, content to generate a media overlay for augmenting an image or video based on context data corresponding to the image or video;
receiving, from the first client device, a selected geolocation indicating a trigger upon which the media overlay is provided, the selected geolocation specifying boundaries for the selected geolocation;
generating, by the server computer, the media overlay using the content received from the first client device;
storing, by the server computer, the generated media overlay in a database associated with the server computer;
associating, by the server computer, the stored media overlay with the selected geolocation received from the first client device as a trigger for providing the media overlay;
receiving, by the server computer, location data from a plurality of client devices;
determining, based on the location data, that a location of each of a subset of the plurality of client devices is within the boundaries for the selected geolocation triggering the media overlay;
publishing the media overlay to each of the subset of client devices having a location within the boundaries of the selected geolocation, wherein the media overlay is displayed on a user interface of each of the subset of client devices for selection to augment a respective image or video captured by each of the client devices;
receiving a message comprising the media overlay applied to an image on a second client device of the subset of the plurality of client devices with a request to provide the message to a third client device;
creating an ephemeral message comprising the media overlay applied to the image by associating the ephemeral message with a maximum duration that the ephemeral message can be viewed on the third client device;
providing, to the third client device, the ephemeral message comprising the media overlay applied to the image;
detecting that the ephemeral message has been viewed on the third client device for the maximum duration; and
deleting the ephemeral message comprising the media overlay applied to the image, causing the ephemeral message to no longer be viewable on the third client device.

2. The method of claim 1, wherein the content comprises a logo or other indicia related to a merchant.

3. The method of claim 1, wherein the media overlay is applied to an image or video on a user interface of at least one client device of the subset of client devices.

4. The method of claim 1, further comprising:
receiving a bid amount for the media overlay; and
associating the bid amount with the media overlay.

5. The method of claim 1, wherein the content comprises an image or video.

6. The method of claim 1, further comprising:
receiving an existing establishment or point of interest indicating a second trigger upon which the media overlay is provided; and
publishing the media overlay to each of a second subset of the plurality of client devices having a location near the point of interest or near the existing establishment.

7. The method of claim 1, further comprising:
receiving time duration information indicating how long a media overlay is associated with the selected geolocation, wherein the time duration information is for a specific time period or the time duration information is for a reoccurring time period; and
associating the time duration information with the media overlay.

8. The method of claim 7, wherein the media overlay is no longer accessible at the selected geolocation after the specified time period or the reoccurring time period has elapsed.

9. The method of claim 1, wherein the selected geolocation is based on a selection of a geolocation on a map displayed on the first client device.

10. The method of claim 1, further comprising:
determining which client devices of the subset of the plurality of client devices is associated with a contact of a user of the first computing device; and
only publishing the media overlay to the client devices of the subset of the plurality of client devise that are associated with a contact of a user of the first computing device.

11. The method of claim 1, further comprising:
temporarily storing the ephemeral message in a data store.

12. The method of claim 11, further comprising:
deleting the ephemeral message from the data store.

13. A server computer comprising:
one or more processors; and
a non-transitory computer-readable storage medium comprising instructions that, when executed by the computing device, cause the server computer to perform operations comprising:
receiving from a first client device, content to generate a media overlay for augmenting an image or video based on context data corresponding to the image or video;
receiving, from the first client device, a selected geolocation indicating a trigger upon which the media overlay is provided, the selected geolocation specifying boundaries for the selected geolocation;
generating the media overlay using the content received from the first client device;
storing the generated media overlay in a database associated with the server computer;
associating the stored media overlay with the selected geolocation received from the first client device as a trigger for providing the media overlay;
receiving location data from a plurality of client devices;
determining, based on the location data, that a location of each of a subset of the plurality of client devices is within the boundaries for the selected geolocation triggering the media overlay;
publishing the media overlay to each of the subset of client devices having a location within the boundaries of the selected geolocation, wherein the media overlay is displayed on a user interface of each of the subset of client devices for selection to augment a respective image or video captured by each of the client devices;
receiving a message comprising the media overlay applied to an image on a second client device of the subset of the plurality of client devices with a request to provide the message to a third client device;
creating an ephemeral message comprising the media overlay applied to the image by associating the ephemeral message with a maximum duration that the ephemeral message can be viewed on the third client device;
providing, to the third client device, the ephemeral message comprising the media overlay applied to the image;
detecting that the ephemeral message has been viewed on the third client device for the maximum duration; and
deleting the ephemeral message comprising the media overlay applied to the image, causing the ephemeral message to no longer be viewable on the third client device.

14. The server computer of claim 13, wherein the content comprises a logo or other indicia related to a merchant.

15. The server computer of claim 13, wherein the media overlay is applied to an image or video on a user interface of at least one client device of the subset of client devices.

16. The server computer of claim 13, the operations further comprising:
receiving a bid amount for the media overlay; and
associating the bid amount with the media overlay.

17. The server computer of claim 13, wherein the content comprises an image or video.

18. The server computer of claim 13, the operations further comprising:
receiving an existing establishment or point of interest indicating a second trigger upon which the media overlay is provided; and
publishing the media overlay to each of a second subset of the plurality of client devices having a location near the point of interest or near the existing establishment.

19. The server computer of claim 13, the operations further comprising:
receiving time duration information indicating how long a media overlay is associated with the selected geolocation, wherein the time duration information is for a specific time period or the time duration information is for a reoccurring time period; and
associating the time duration information with the media overlay.

20. A non-transitory computer-readable storage medium comprising instructions that, when executed by one or more processors of a computing device, cause the computing device to perform operations comprising:
receiving from a first client device, content to generate a media overlay for augmenting an image or video based on context data corresponding to the image or video;
receiving, from the first client device, a selected geolocation indicating a trigger upon which the media overlay is provided, the selected geolocation specifying boundaries for the selected geolocation;
generating the media overlay using the content received from the first client device;
storing the generated media overlay in a database associated with the server computer;
associating the stored media overlay with the selected geolocation received from the first client device as a trigger for providing the media overlay;
receiving location data from a plurality of client devices;
determining, based on the location data, that a location of each of a subset of the plurality of client devices is within the boundaries for the selected geolocation triggering the media overlay;
publishing the media overlay to each of the subset of client devices having a location within the boundaries of the selected geolocation, wherein the media overlay is displayed on a user interface of each of the subset of client devices for selection to augment a respective image or video captured by each of the client devices;
receiving a message comprising the media overlay applied to an image on a second client device of the subset of the plurality of client devices with a request to provide the message to a third client device;
creating an ephemeral message comprising the media overlay applied to the image by associating the ephemeral message with a maximum duration that the ephemeral message can be viewed on the third client device;

providing, to the third client device, the ephemeral message comprising the media overlay applied to the image;

detecting that the ephemeral message has been viewed on the third client device for the maximum duration; and deleting the ephemeral message comprising the media overlay applied to the image, causing the ephemeral message to no longer be viewable on the third client device.

\* \* \* \* \*